United States Patent
Bartolozzi et al.

(10) Patent No.: US 9,656,529 B2
(45) Date of Patent: May 23, 2017

(54) SUSPENSION GROUP IN PARTICULAR FOR MOTORIZED VEHICLES

(71) Applicant: PIAGGIO & C. S.p.A., Pisa (IT)

(72) Inventors: Stefano Bartolozzi, Pisa (IT); Michele Bertelli, Pisa (IT); Luigi Dall'Igna, Pisa (IT); Riccardo Savin, Pisa (IT)

(73) Assignee: PIAGGIO & C. S.p.A., Pisa (IT)

( * ) Notice: Subject to any disclaimer, the term of this patent is extended or adjusted under 35 U.S.C. 154(b) by 0 days.

(21) Appl. No.: 14/763,910

(22) PCT Filed: Feb. 7, 2014

(86) PCT No.: PCT/IB2014/058857
§ 371 (c)(1),
(2) Date: Jul. 28, 2015

(87) PCT Pub. No.: WO2014/125404
PCT Pub. Date: Aug. 21, 2014

(65) Prior Publication Data
US 2015/0367697 A1 Dec. 24, 2015

(30) Foreign Application Priority Data
Feb. 12, 2013 (IT) .............................. PD2013A0030

(51) Int. Cl.
*B60G 17/02* (2006.01)
*B60G 15/06* (2006.01)
(Continued)

(52) U.S. Cl.
CPC ........... *B60G 15/062* (2013.01); *B60G 17/02* (2013.01); *B60G 17/021* (2013.01);
(Continued)

(58) Field of Classification Search
CPC .............................. B60G 15/062; B60G 17/02
See application file for complete search history.

(56) References Cited

U.S. PATENT DOCUMENTS 3,417,986 A 12/1968 Fuke
4,360,214 A 11/1982 Isono
(Continued)

FOREIGN PATENT DOCUMENTS

DE 19942890 A1 3/2001
DE 102006012640 B8 10/2008
(Continued)

*Primary Examiner* — Nicole Verley
(74) *Attorney, Agent, or Firm* — Arent Fox LLP; Michael Fainberg

(57) ABSTRACT

Suspension group for motorized vehicles comprising a main spring which extends between a first and a second end of the group, a main damper connected in parallel to said main spring said main spring being pre-loaded by pre-loading means which together press the spring in compression and impose a rest length thereon, namely the length assumed by the spring when there are no further external loads on the first and/or on the second end of the group except for the pre-load caused by the pre-loading means, wherein the first and second end are connected kinematically to a first and a second mass of the motor vehicle respectively, the first mass being a mass suspended by the suspension group and the second mass being a non-suspended mass.

19 Claims, 22 Drawing Sheets

(51) Int. Cl.
*B60G 17/027* (2006.01)
*F16F 9/56* (2006.01)
*F16F 9/58* (2006.01)

(52) U.S. Cl.
CPC ............ *B60G 17/0272* (2013.01); *F16F 9/56* (2013.01); *F16F 9/58* (2013.01); *B60G 2202/12* (2013.01); *B60G 2202/152* (2013.01); *B60G 2202/312* (2013.01); *B60G 2202/412* (2013.01); *B60G 2202/413* (2013.01); *B60G 2204/128* (2013.01); *B60G 2204/129* (2013.01); *B60G 2204/421* (2013.01); *B60G 2204/44* (2013.01); *B60G 2204/45* (2013.01); *B60G 2500/30* (2013.01); *B60G 2800/914* (2013.01)

(56) References Cited

U.S. PATENT DOCUMENTS

| | | | | |
|---|---|---|---|---|
| 5,224,689 | A | * | 7/1993 | Georgiev ................. F16F 3/04 267/168 |
| 5,697,634 | A | * | 12/1997 | Kamimae ............ B60G 13/003 280/124.108 |
| 6,494,442 | B2 | | 12/2002 | Beck et al. |
| 7,070,012 | B2 | * | 7/2006 | Fecteau .................. B62K 25/06 180/190 |
| 7,681,897 | B2 | | 3/2010 | Beck |
| 8,733,744 | B2 | * | 5/2014 | Kerr ........................ F16F 15/02 267/136 |

FOREIGN PATENT DOCUMENTS

| | | | | |
|---|---|---|---|---|
| DE | 10352212 | B4 | 12/2014 | |
| EP | 0466628 | B1 | 12/1994 | |
| EP | 1535828 | B9 | 10/2008 | |
| FR | 2689062 | B1 | 8/1995 | |
| JP | 623004 | B2 | 1/1987 | |
| JP | 629044 | B2 | 2/1987 | |
| JP | 02120103 | A | 5/1990 | |
| JP | 02120106 | A | 5/1990 | |
| JP | 035322 | B2 | 1/1991 | |
| JP | 4244406 | A | 9/1992 | |
| JP | 0516627 | A | 1/1993 | |
| JP | EP 1535828 A2 * | | 6/2005 | ........... B62K 25/283 |
| JP | 2006131066 | A | 6/2006 | |
| JP | DE 102006012640 A1 * | | 10/2006 | ............... B60G 3/14 |
| JP | 4577049 | B2 | 11/2010 | |
| WO | 9104876 | A1 | 4/1991 | |
| WO | 2004028883 | A1 | 4/2004 | |

* cited by examiner

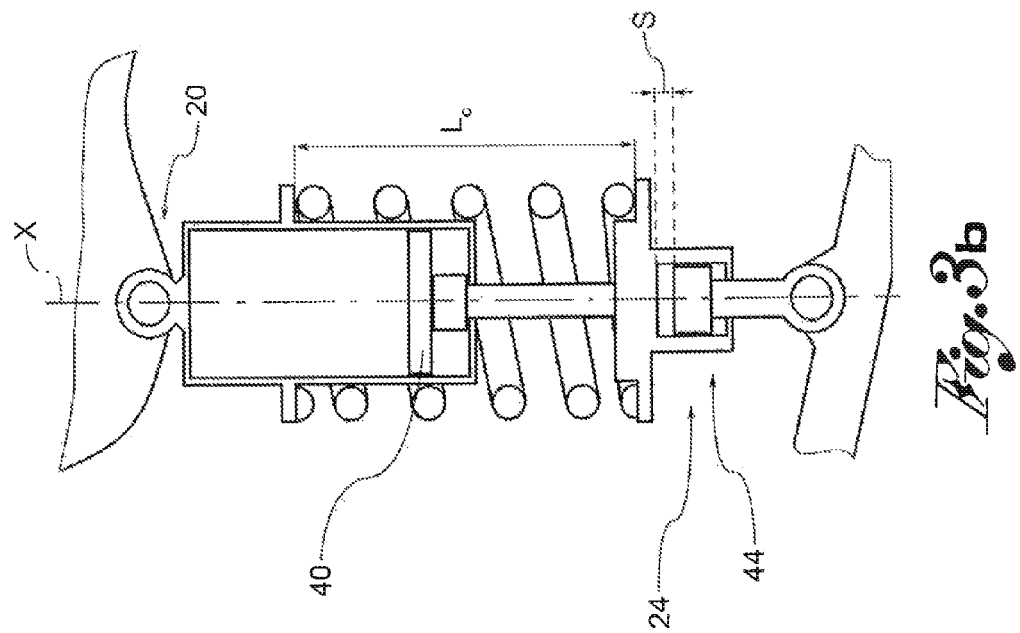
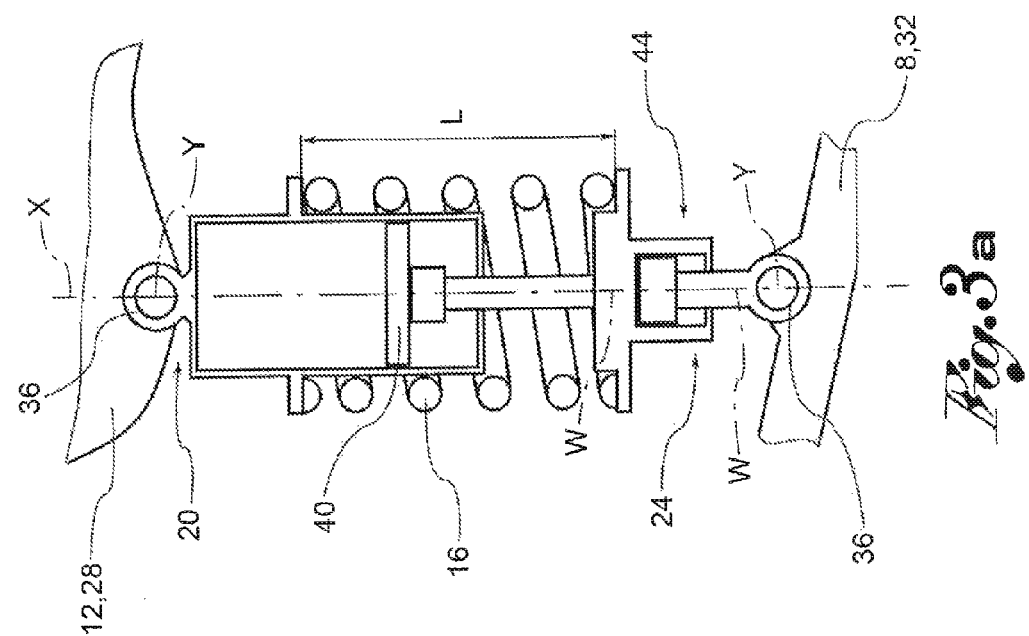

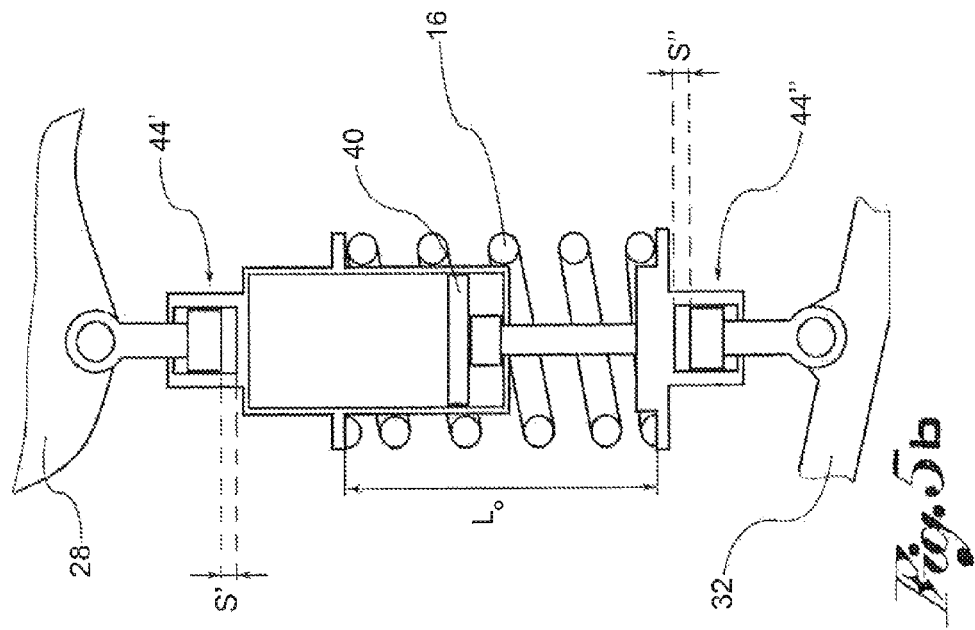
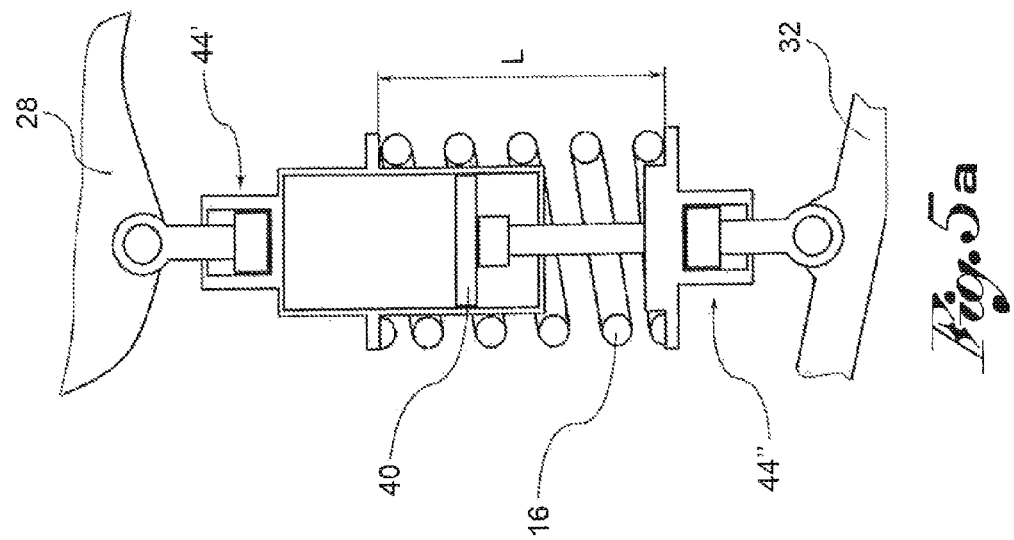

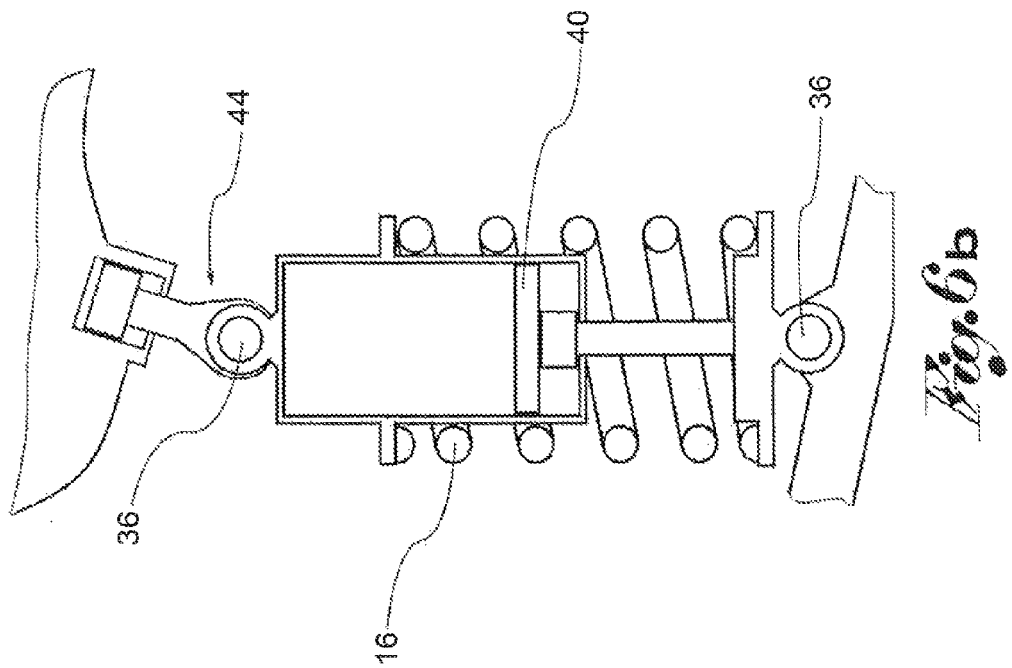
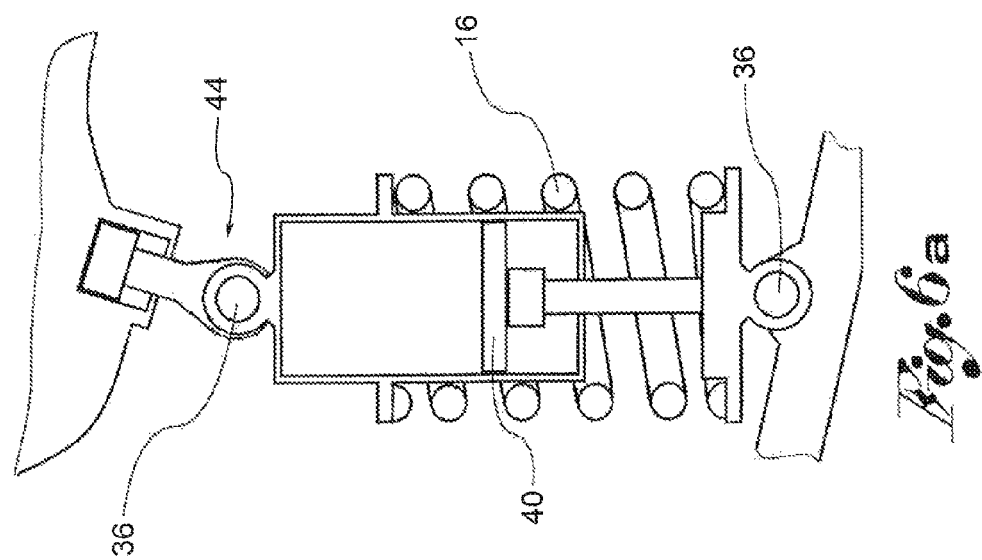

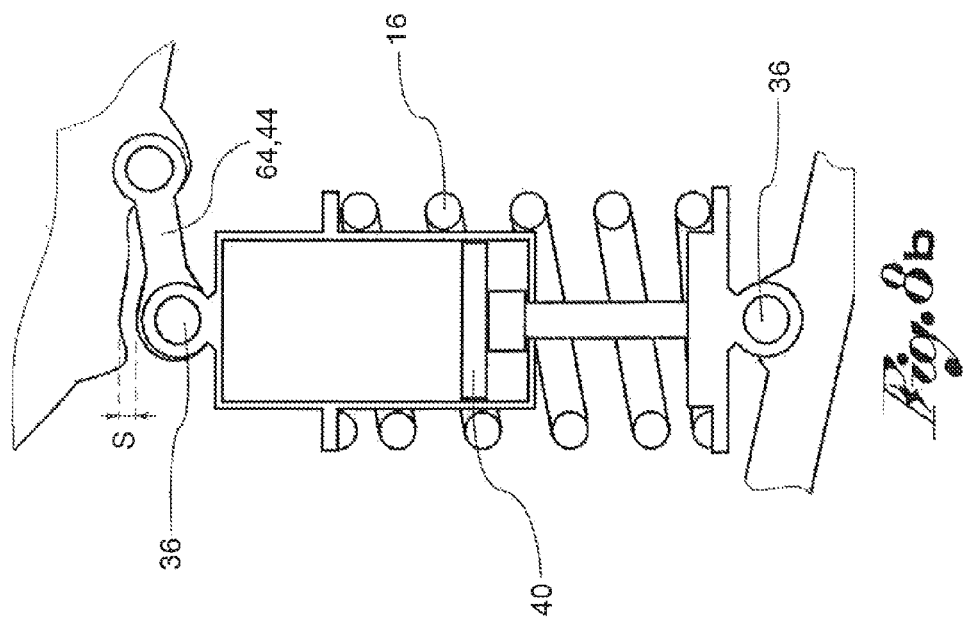
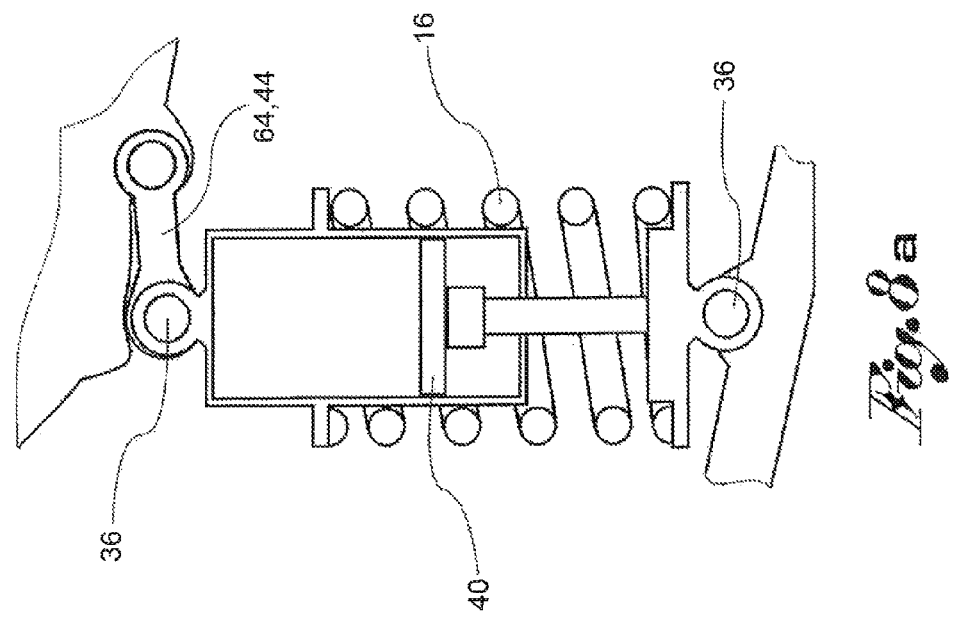

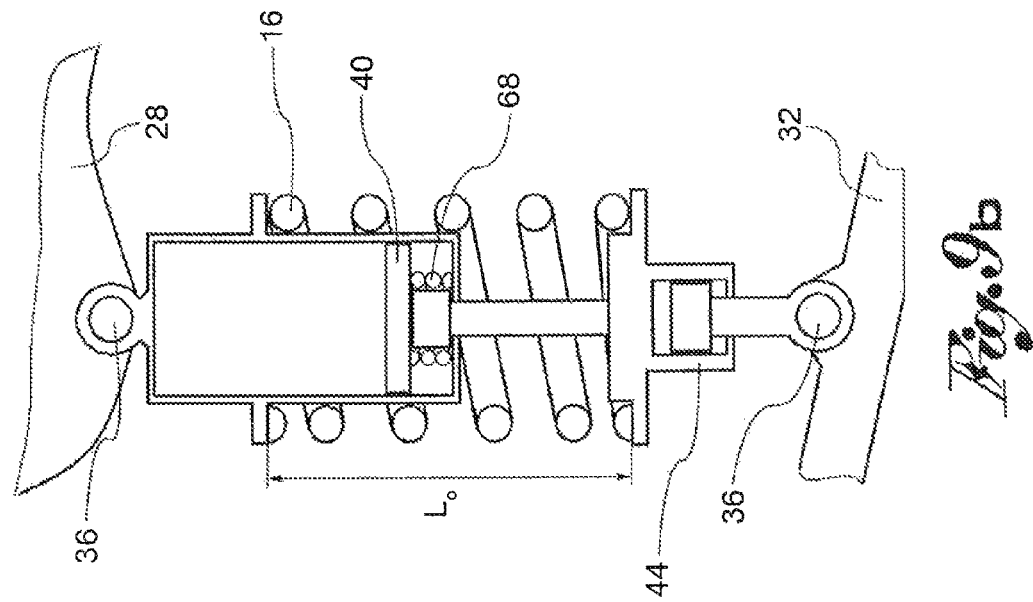
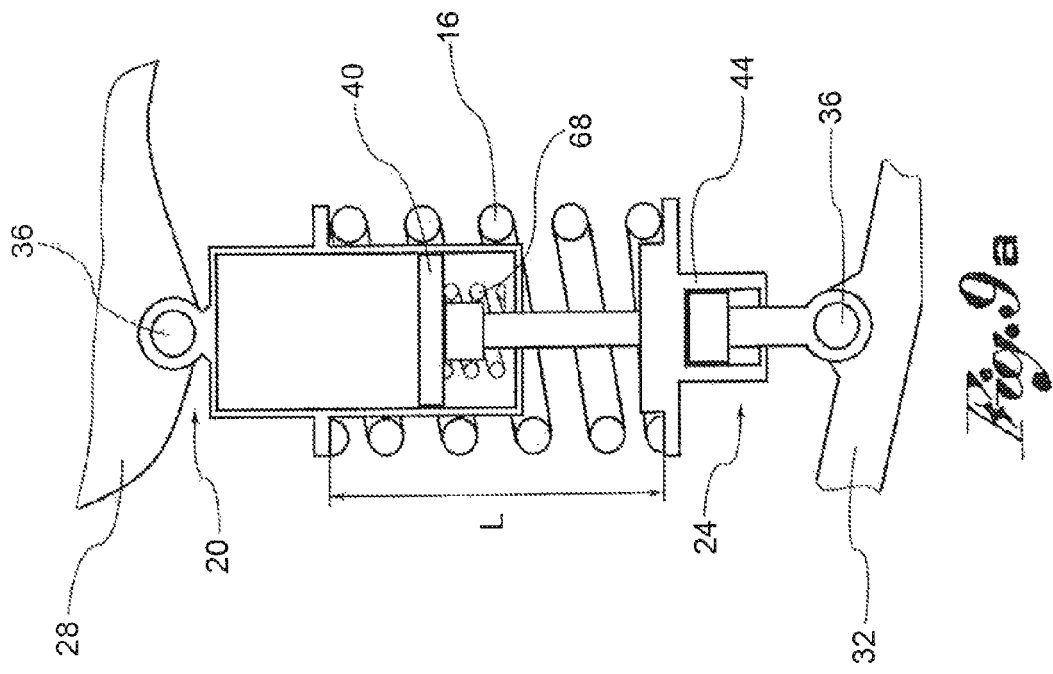

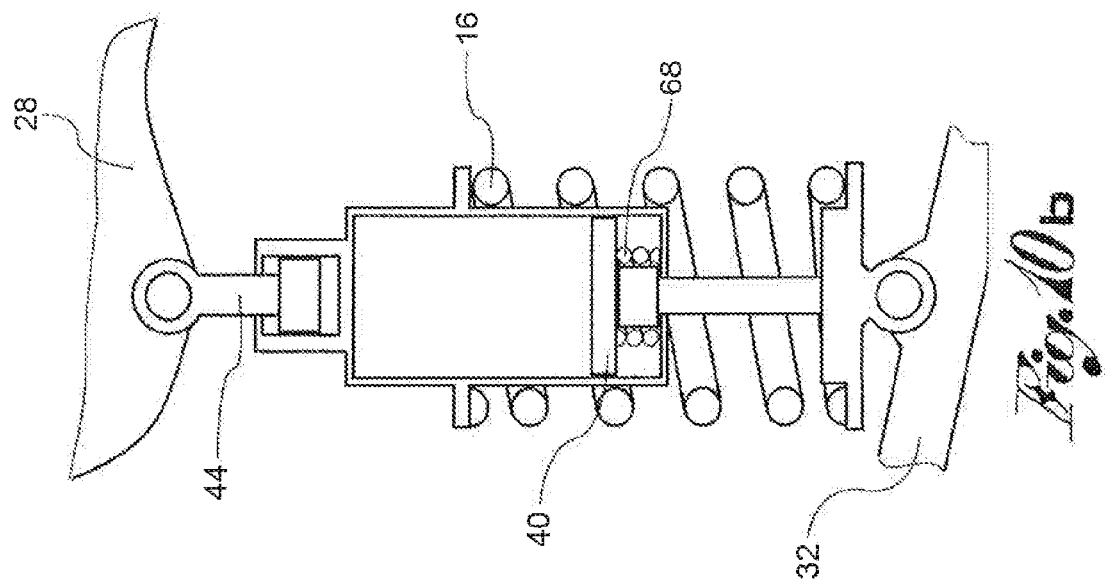
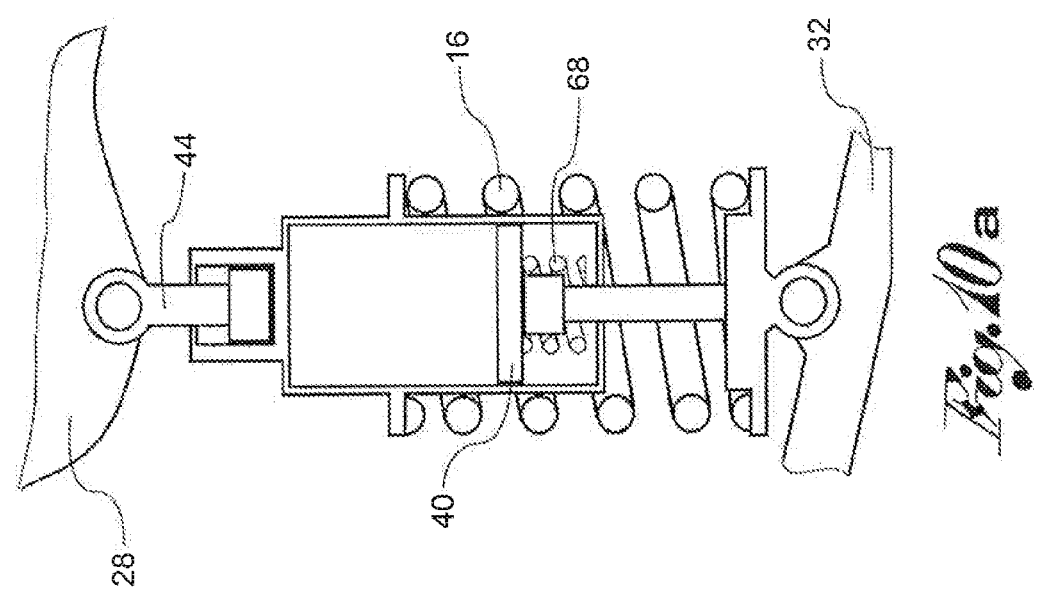

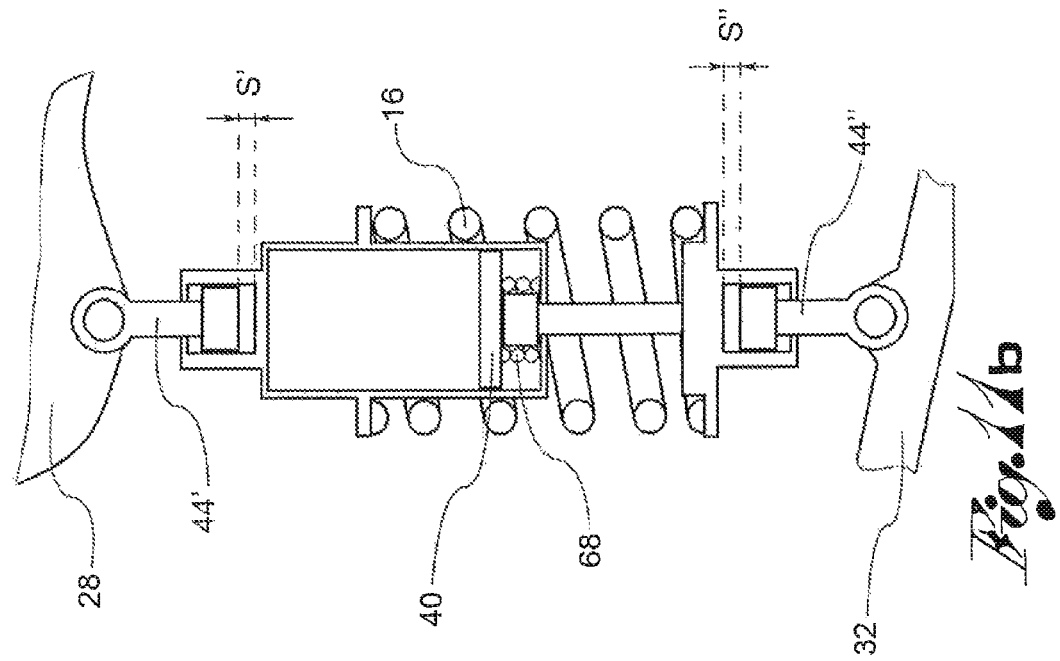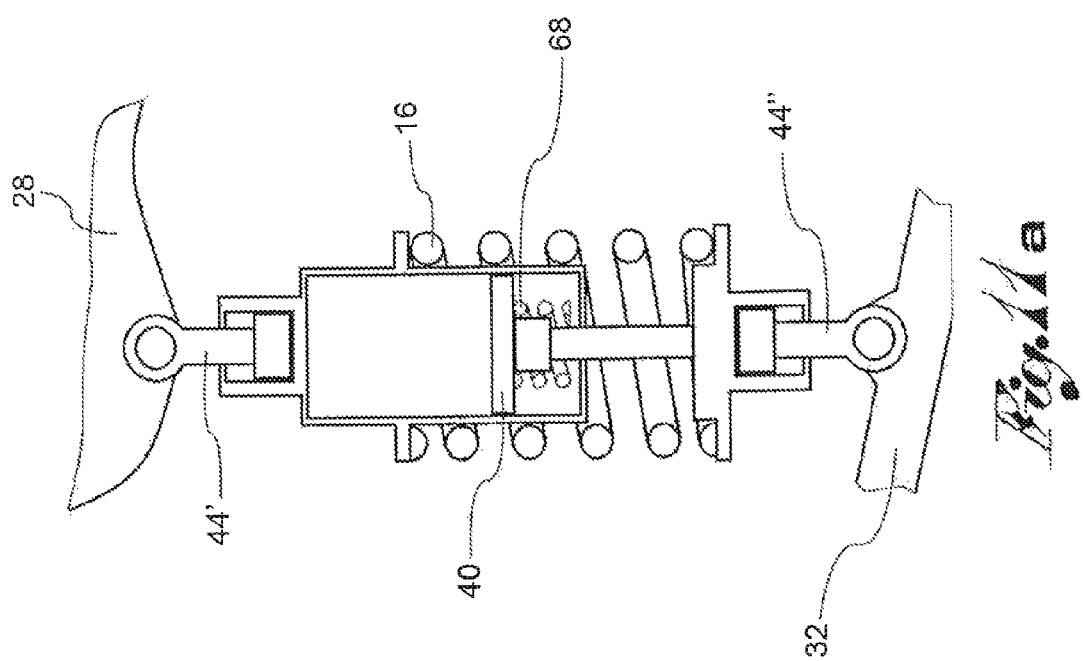

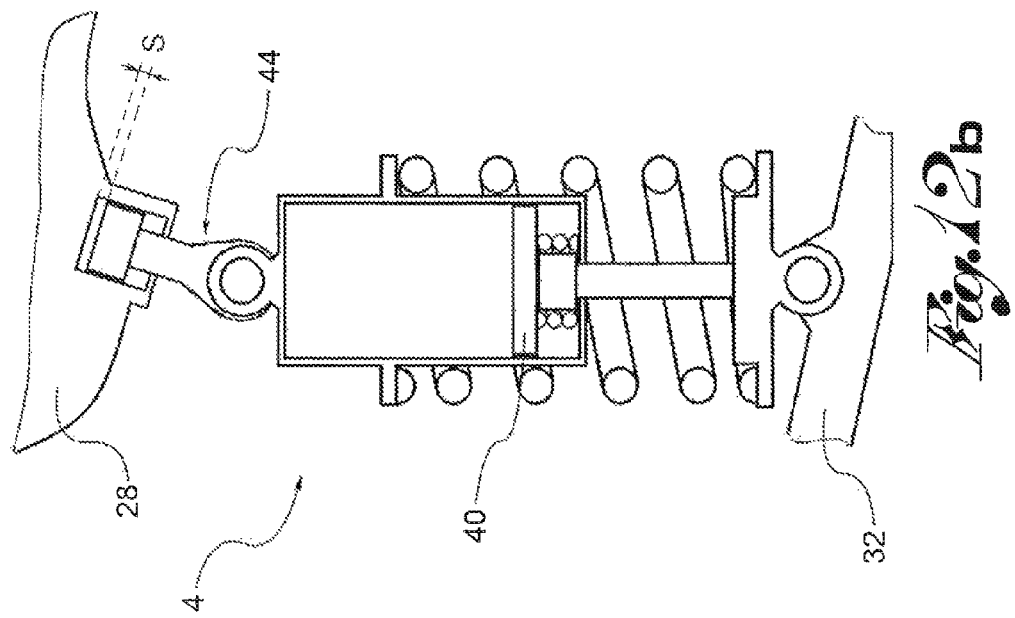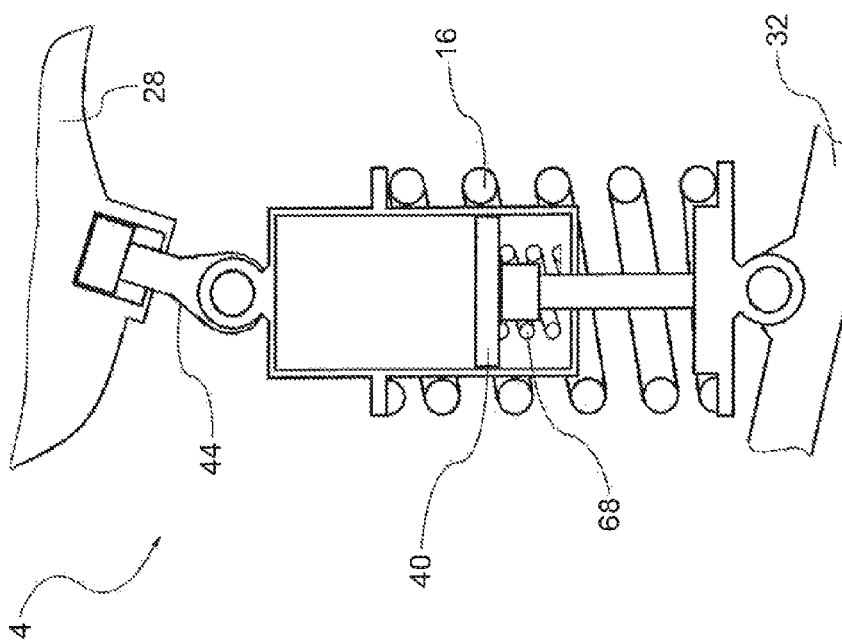

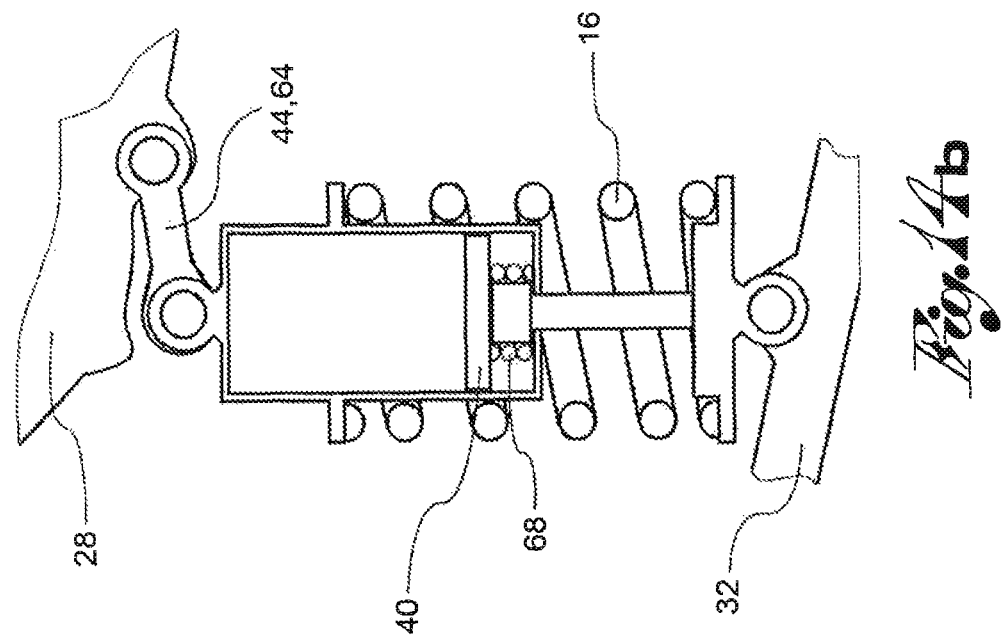
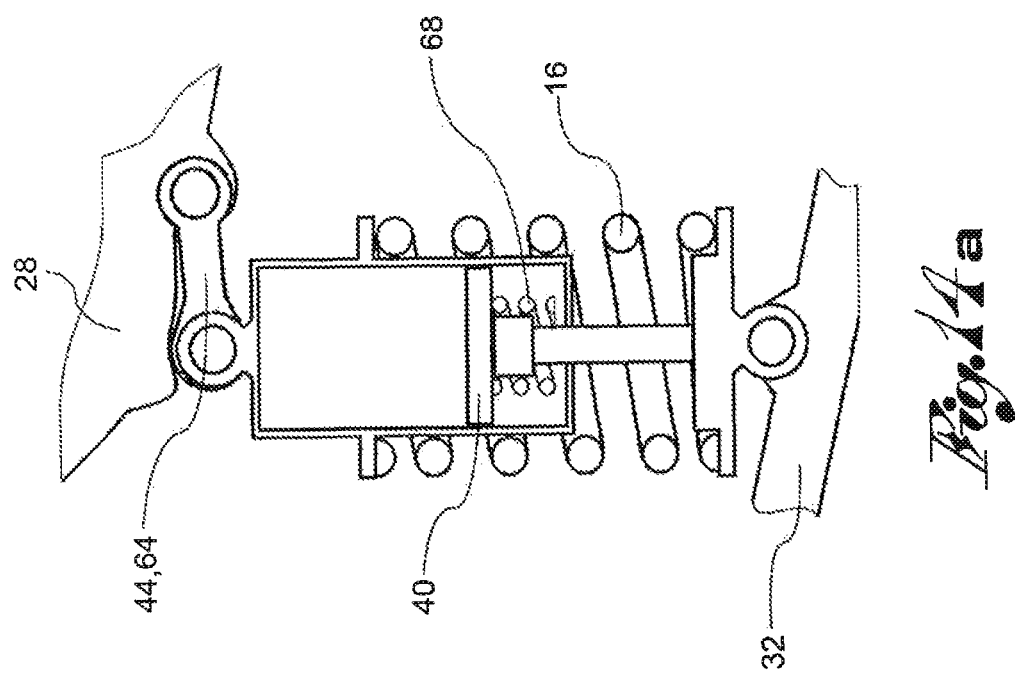

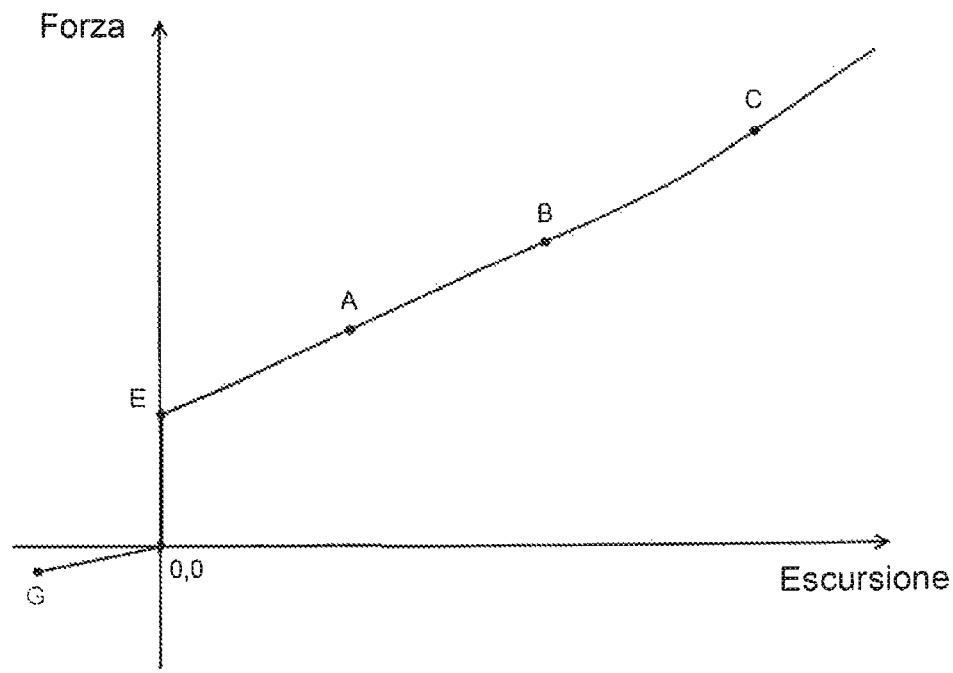
*Fig.15*a
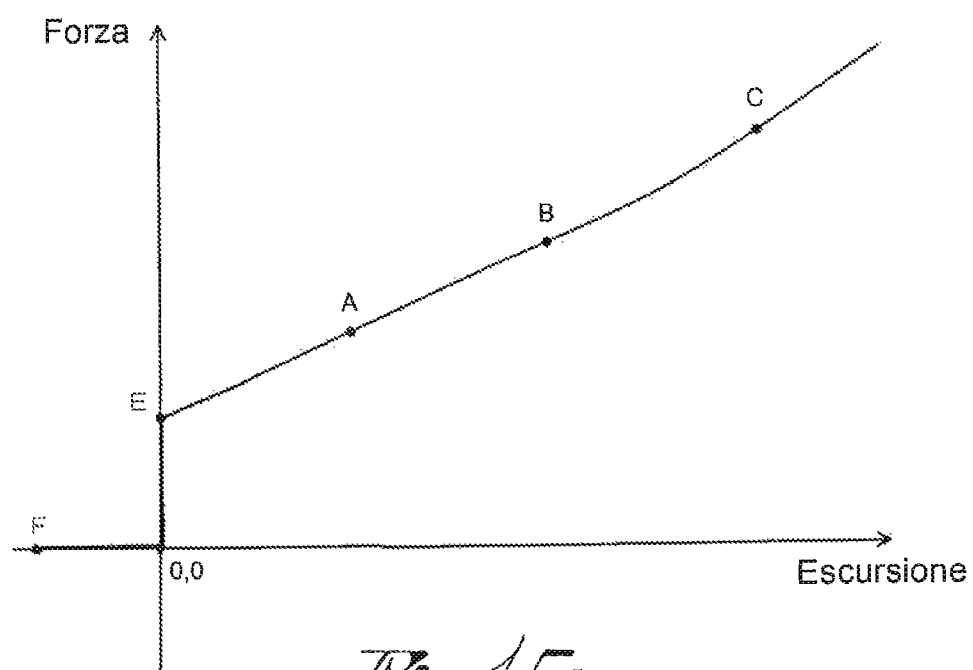
*Fig.15*b

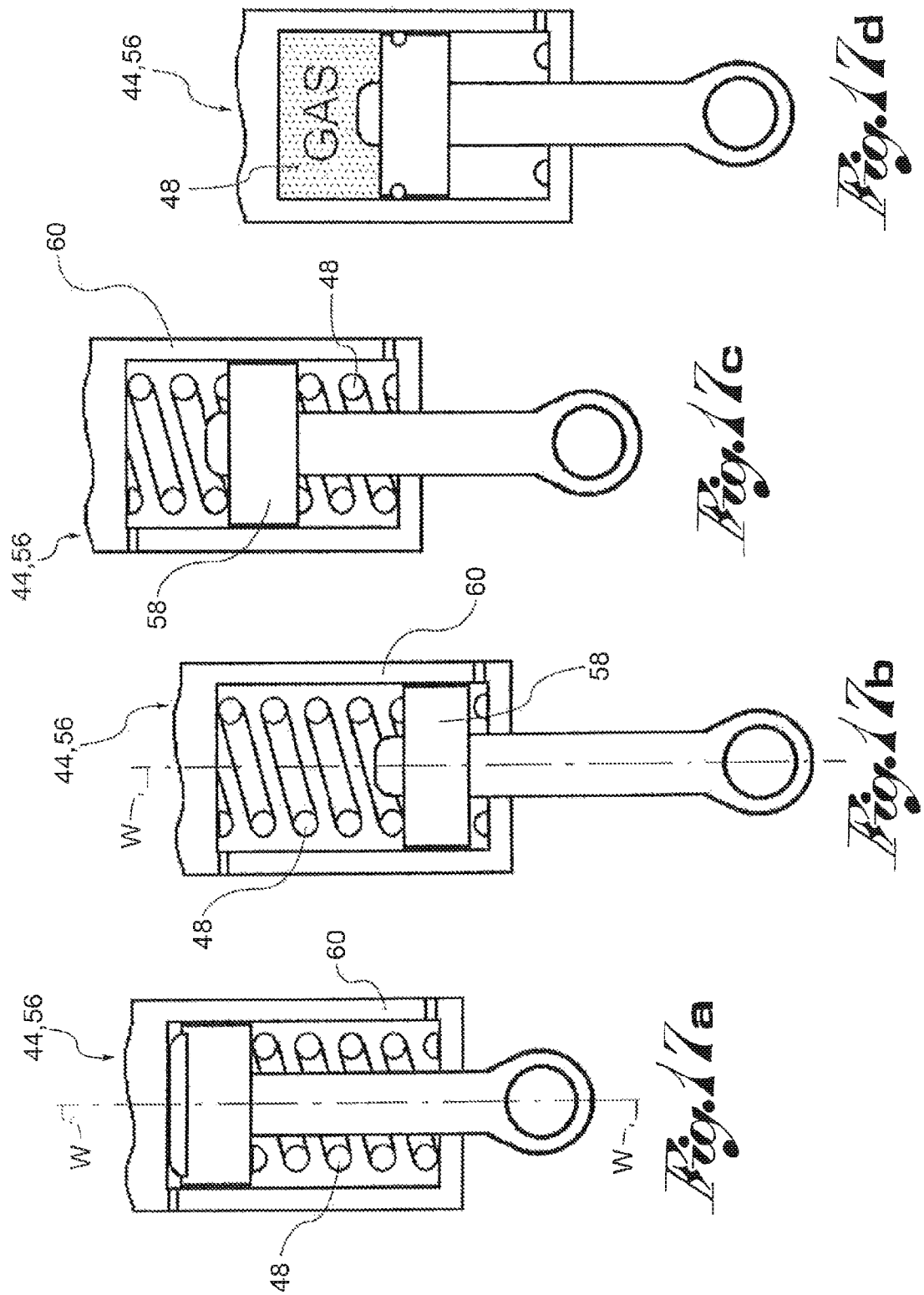

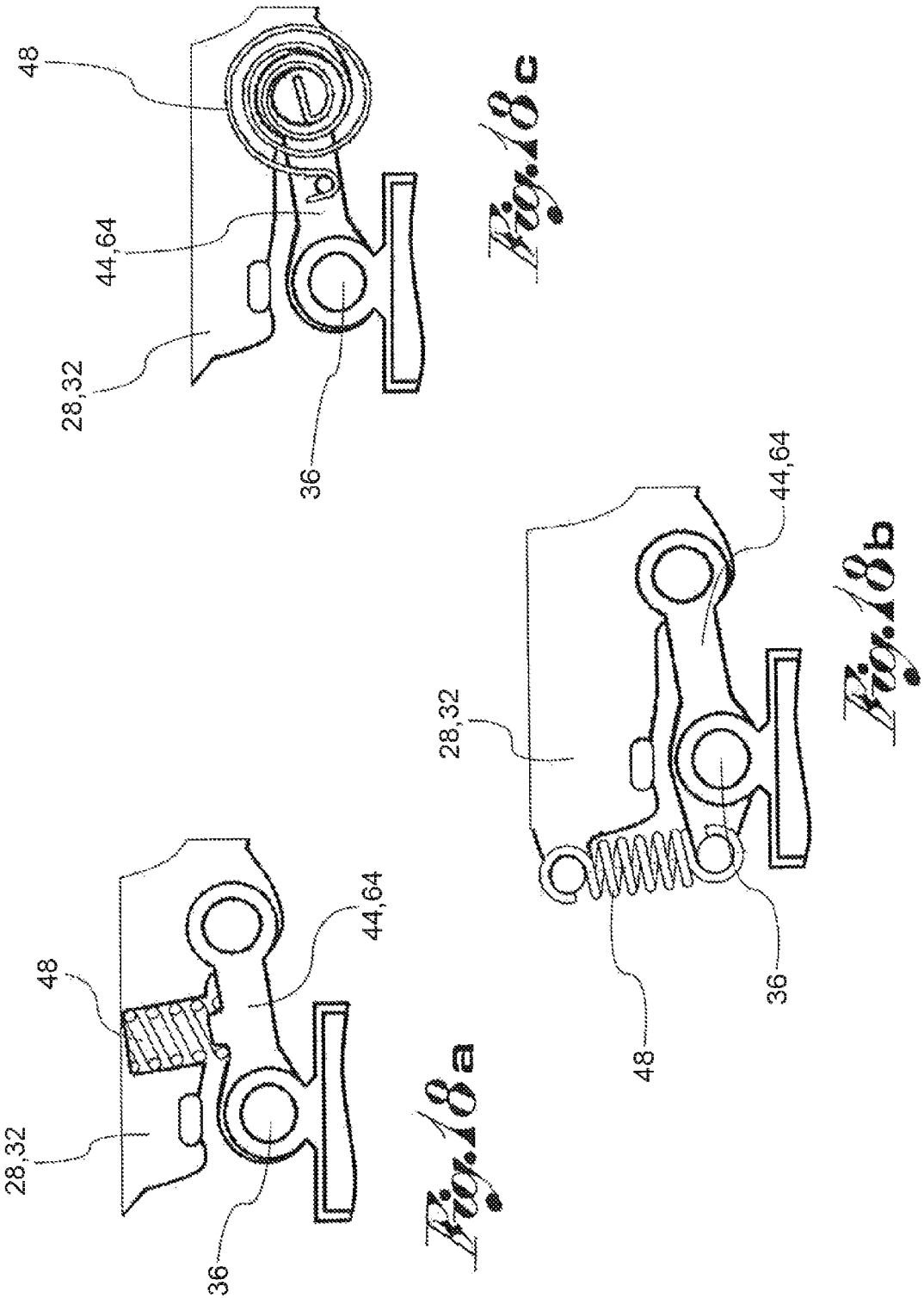

SUSPENSION GROUP IN PARTICULAR FOR MOTORIZED VEHICLES

FIELD OF APPLICATION

The present invention relates to a suspension group, in particular for motorised vehicles.

STATE OF THE ART

As is known, in motorised land vehicles making use of wheels, the lack of contact of one or more wheels with the ground causes serious problems of driveabilty and of traction. The cause of the phenomenon may reside in the conformation of the terrain or in the dynamics of the vehicle. Known examples of this phenomenon are:
- in a four-wheeled vehicle which takes a curve at high speed such as for example a racing car, one or both wheels on the inside of the curve may lose contact with the ground as a result of the roll of the vehicle,
- in an off-road vehicle travelling over uneven terrain, such as for example a rally car, a wheel may lose contact with the ground as a result of a hole which is too deep for the maximum admissible wheel stroke
- in a vehicle which travels over the brow of a hill or an obstacle at high speed, such as for example a racing car, the lifting motion resulting from the suspended mass may lead to a loss of contact of one or more wheels with the ground, giving rise to problems of directionality and traction
- in two-wheeled vehicles, such as for example a racing bike, the back wheel may lose contact with the ground upon braking, or the front wheel may lose contact with the ground upon accelerating.

In most of these cases the loss of contact with the ground is caused by reaching the maximum extension of the suspension. In many suspension systems the function of generating the elastic force is attributed to a single subsystem (with linear or rotary excursion) which is connected to the remaining parts of the suspension system and to the suspended mass of the vehicle at its two ends.

For these vehicles frequently the condition of maximum extension of the suspension and thus of detachment from the ground of the relative wheel occurs when said sub-system reaches its limit stop position at maximum extension. In many vehicles said elastic sub-system exercises a thrust force (which thus tends to make the ends thereof move away from each other) until it reaches its limit stop position at maximum extension, but in some solutions close to this condition the force exercised by the elastic sub-system becomes a traction force, it thus becoming necessary to exercise a traction force on the subsystem from the outside to extend it completely. In such latter case it will be the weight of the non-suspended mass which exercises this traction force on the subsystem near the condition of maximum extension of the suspension, that is near the condition of detachment of the wheel from the ground, and it may happen that the detachment of the wheel from the ground occurs before effectively reaching the limit stop condition in extension, simply because the weight of the non-suspended mass is not sufficient to completely extend the elastic subsystem. For the purposes of the invention in question, the condition of maximum extension is equal to the so called rest length of the spring, that is the length or extension which the spring assumes when it is free to extend inasmuch as subjected solely to the pre-load but not to the weight deriving from the suspended mass. In other words, when the wheel tends to lift off the ground, the spring is no longer compressed by the weight deriving from the suspended mass but is free to extend as a function merely of the compression pre-load and of the weight of the non-suspended mass. Consequently, the length assumed by the spring in detached conditions of the wheel is due to its rigidity and the pre-load imposed on it; such length may be defined as rest length, that is, in unloaded conditions of the spring except for its possible pre-load.

PRESENTATION OF THE INVENTION

To resolve the aforesaid problems, as of today some solutions have been used in the prior art. For example, in the current state of the art two types of solution are used able to reduce the aforesaid phenomena of detachment of a wheel from the ground, that is, the so-called counter-spring and the so-called "helper-spring".

The so-called "counter-spring" or contractor" spring (FIGS. 1a-1b), that is a spring located inside the body of the shock absorber is such as to be completely compressed when the elastic sub-system is completely extended: the effect is to substantially reduce the elastic force near the entirely extended position of the elastic subsystem, opposing the force of the main spring, which is usually pre-loaded even in the position of maximum extension of the elastic subsystem. To such purpose see the graph in FIG. 1b, showing the force-excursion diagram of the elastic subsystem: the effect of the counter spring is to modify the force curve so as to make it pass from the section ED to the section FD (without counter spring). The graph in FIG. 1b shows the condition in which by effect of the counter spring being mounted, the elastic subsystem in its position of equilibrium (point 0.0 of the graph, null force at the ends) is not in its position of maximum extension (coinciding with the point F).

Such solution (counter spring) significantly reduces the forces which tend to completely extend the suspension in a very short section of excursion, close to the fully extended position, but, as may be seen from the graph in FIG. 1b, significantly increases the rigidity of the elastic subsystem in such section: in the case in which the counter spring permits a further extension after the force has been annulled (section from 0,0 to point F); in any case with little excursion, it will develop a high traction force and will rapidly be able to lift the wheel from the ground.

As regards the 'helper spring' (or "assist-spring" or "tender-spring", FIG. 2a-2b), this is a spring installed in series with the main spring of the elastic subsystem, of much lower rigidity, so as to generate a force-excursion diagram of the elastic sub-system of the bilinear type, such that in the first part of stroke from it position of maximum extension the elastic subsystem has a much lesser rigidity. To such purpose see the graph in FIG. 2b, the section interested by the "helper-spring" is the section ED. This type of solution is used when upon full extension of the suspension (usually determined by the full extension of the shock absorber) the main spring is mounted with clearance in its direction of movement, that is to say, housed in a bigger space than its free length: the function of the "helper-spring" is, as the name would suggest, to keep the main spring in its seat without letting it jerk.

Such second solution instead maintains a very low rigidity in the first section, but cannot be used in conjunction with the counter-spring and requires the use of shock absorbers with a lot of excursion which are thus longer and occupy more space, and thus heavier and not always possible to install. In addition, for the entire section which goes from point A to point E of the graph it is not possible to brusquely lower the force of the suspension as in the case of the counter-spring.

The need is therefore felt to resolve the drawbacks and limitations mentioned above with reference to the prior art.

Such purpose is achieved by a suspension group according to claim 1.

DESCRIPTION OF THE DRAWINGS

Further characteristics and advantages of the present invention will be more clearly comprehensible from the description given below of its preferred and non-limiting embodiments, wherein:

FIGS. 3a,3b-8a, 8b show variants of suspension groups according to the present invention, in which each suspension group is shown both in the compressed configuration (figures "a") and in the fully extended configuration (figures "b");

FIG. 9a, 9b-14a, 14b show variants of the suspension groups in FIGS. 3a,3b-8a,8b, in which each suspension group is shown both in the compressed configuration (figures "a") and in the fully extended configuration (figures "b");

FIGS. 15a-15c show the force-excursion diagrams relative to the construction solutions illustrated in FIGS. 3a,3b-8a, 8b;

FIGS. 17-20 show variants of components of suspension groups according to the present invention.

The elements or parts of elements common to the embodiments described below will be indicated using the same reference numerals.

DETAILED DESCRIPTION

Figure 1A:
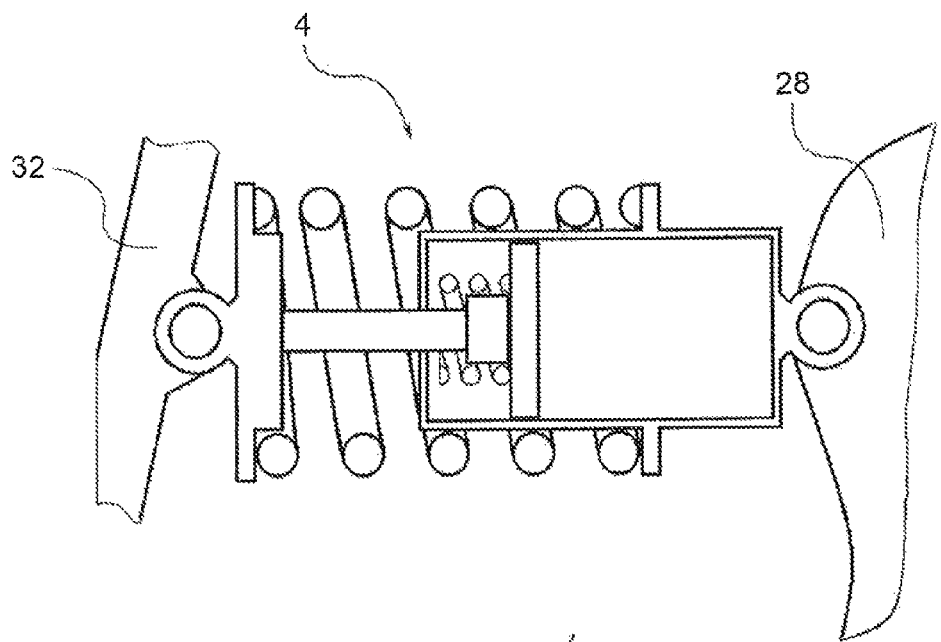
FIGS. 1a-1b respectively represent an assembly diagram of a suspension with counter-spring and the relative force-excursion diagram according to a solution of the prior art.
Figure 1B:
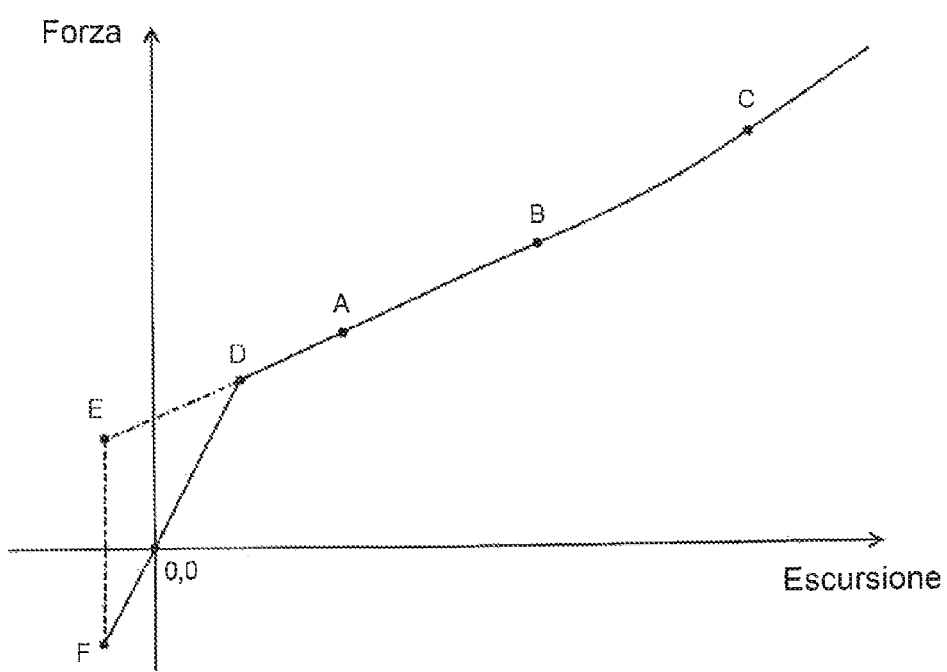
Figure 2A:
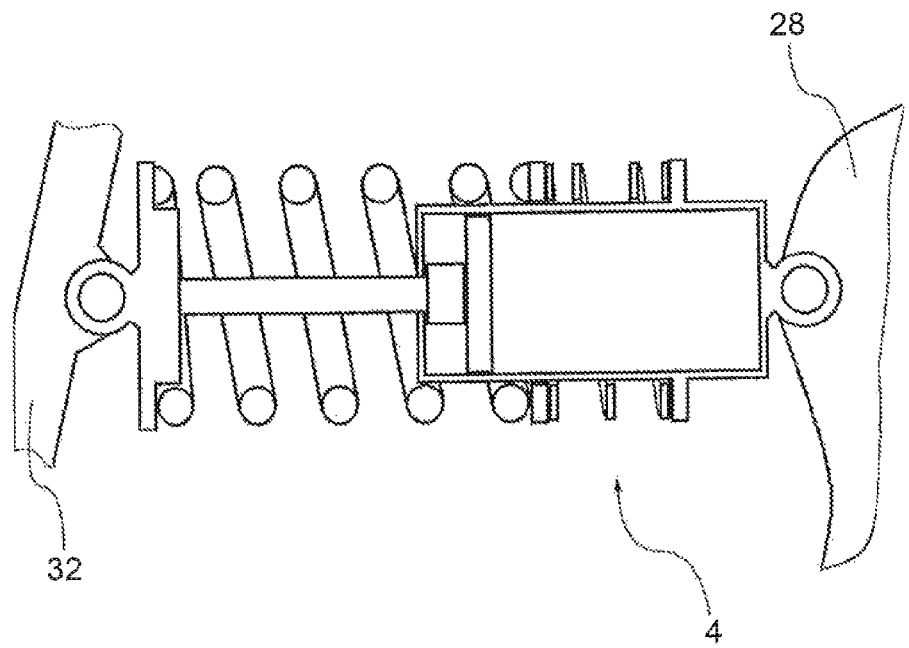
FIGS. 2a-2b respectively represent an assembly diagram of a suspension with helper-spring and the relative force-excursion diagram according to a further solution of the prior art.
Figure 2B:
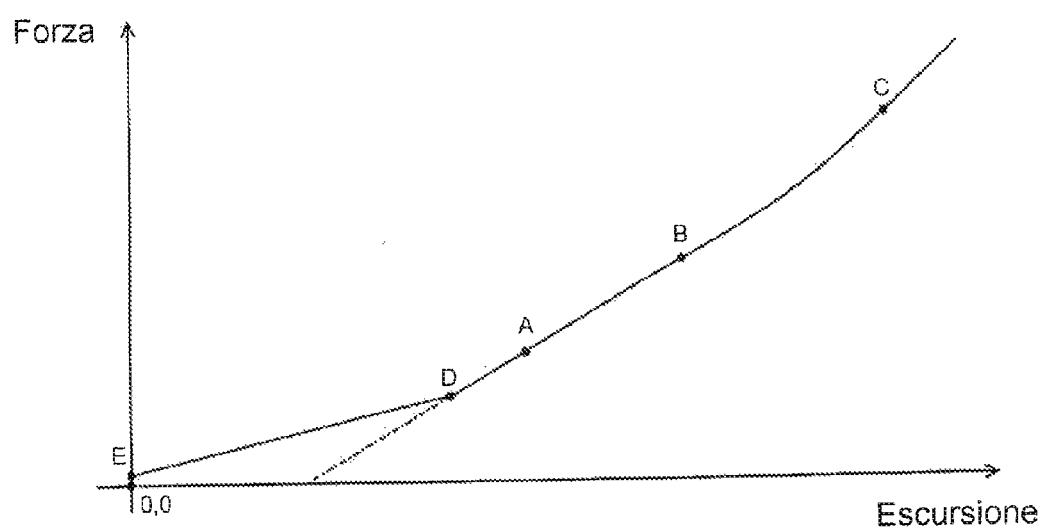
Figure 4B:
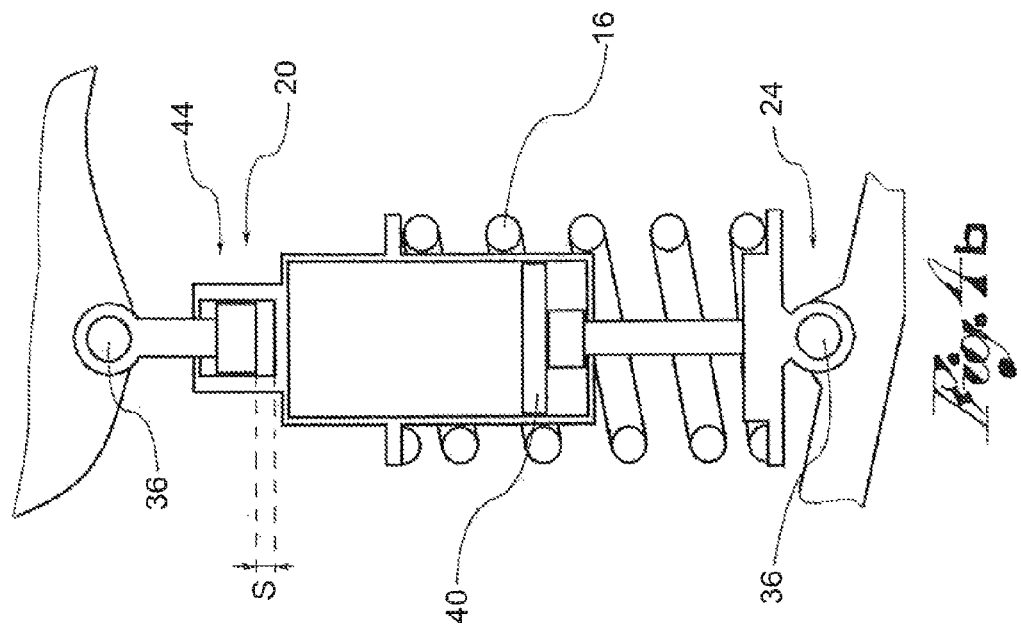
Figure 4A:
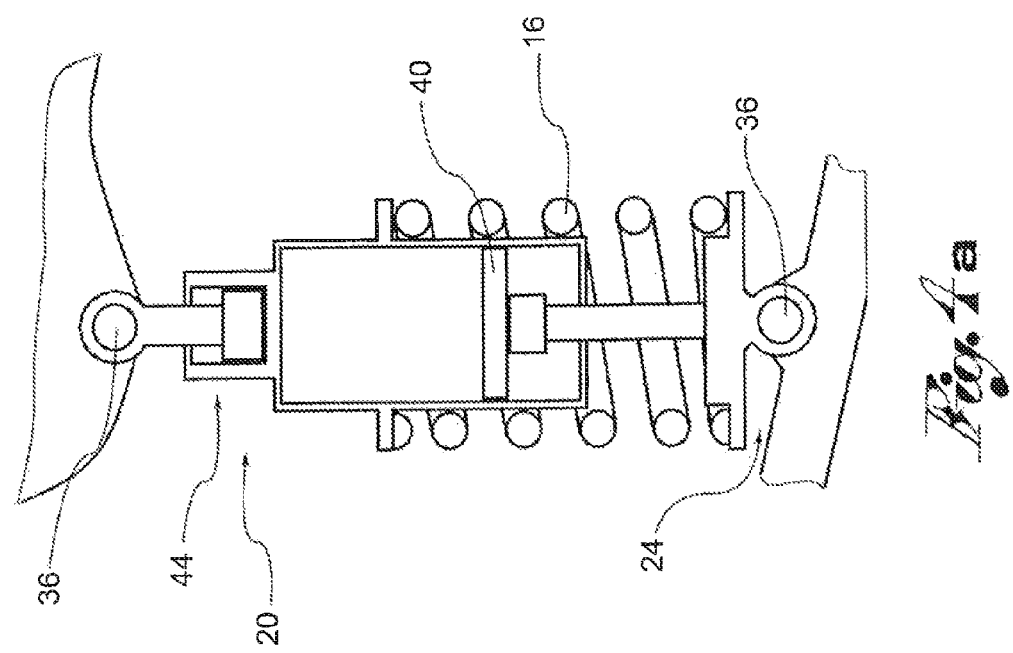
Figure 7A:
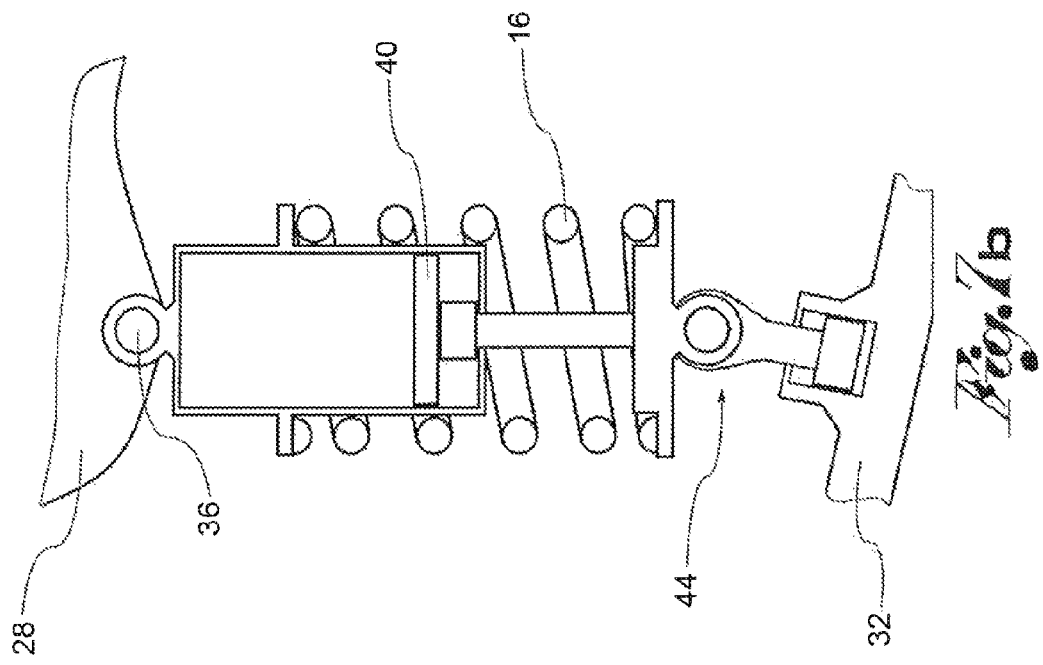
Figure 7B:
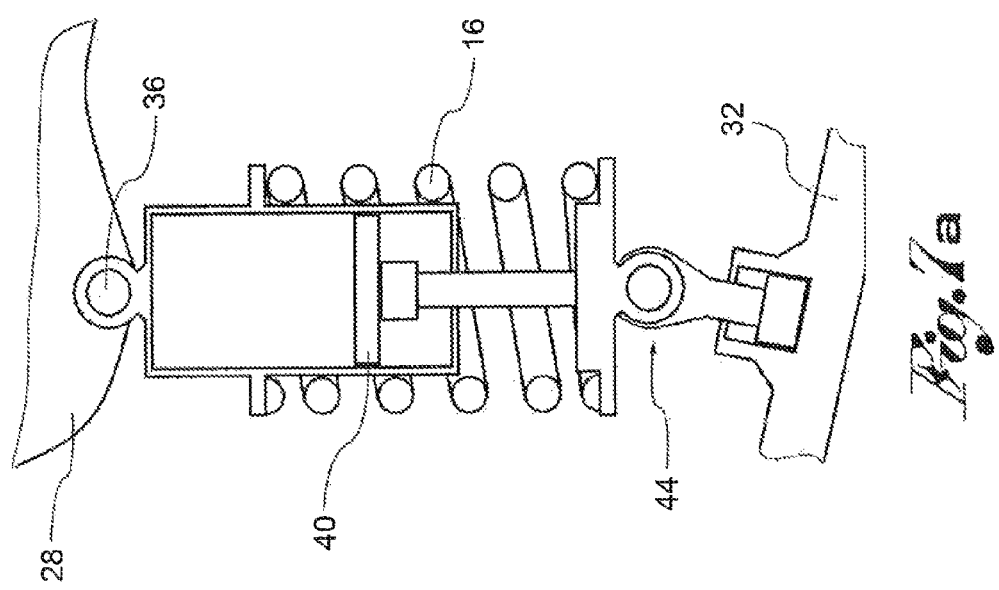
Figure 13A:
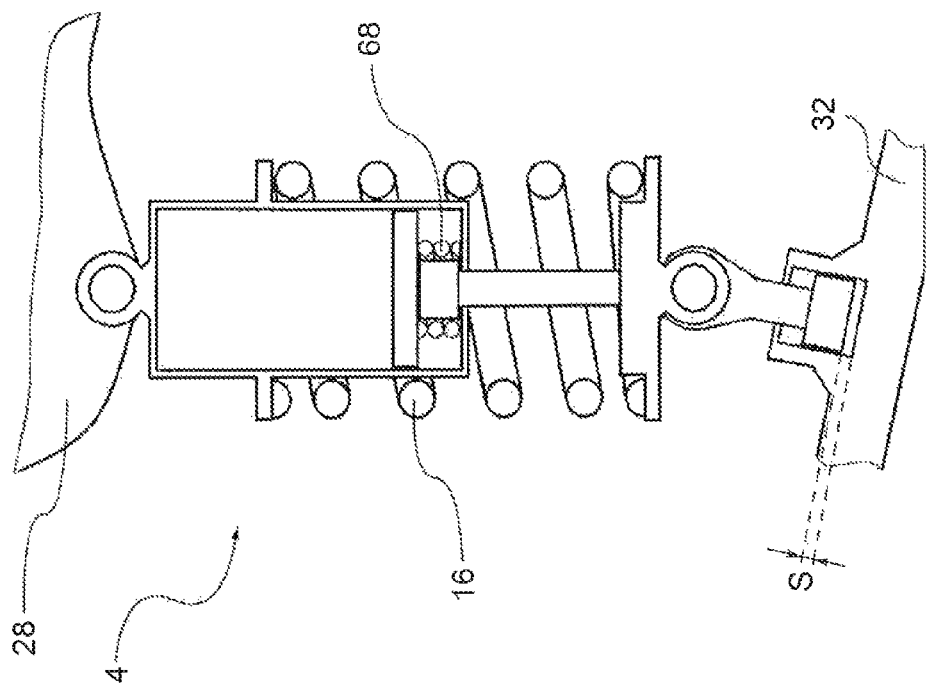
Figure 13B:
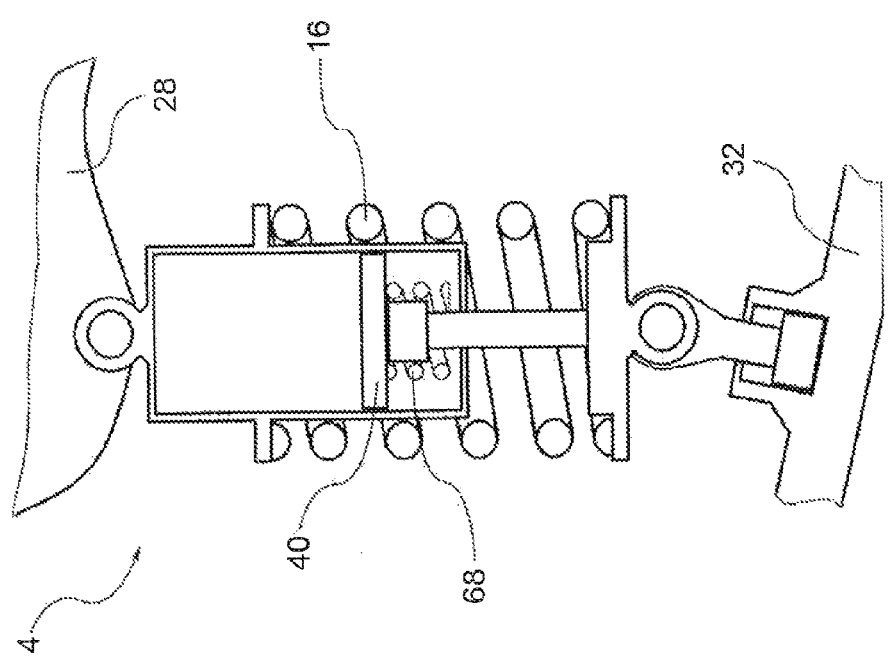

With reference to the aforementioned figures, reference numeral 4 globally denotes an overall schematic view of suspension group for motorised vehicles according to the present invention.

For the purposes of the present invention it must be specified that the term motorised vehicle must considered in a broad sense, comprising any motorcycle having at least two wheels, that is a front wheel and a back wheel. Such definition thus encompasses motor cycles having three wheels, of which for example two paired and steering wheels on the front axle and one drive wheel, on the rear axle, but also motorcycles which comprise a single steering wheel on the front axle and two drive wheels on the rear axle. Lastly, such definition also comprises so-called quad bikes having two wheels on the front axle and two wheels on the rear axle.

Preferably, the term suspension group 4 is understood to mean preferably but not exclusively, a rear suspension, that is placed between the rear axle or swingarm 8, having one or more wheels, and the frame 12 operatively connected to said suspension.

The frame 12 may be in one piece or in several parts: generally the portion of frame 12 interfacing with the swingarm 8 supports the saddle for the rider and/or passenger. The swingarm 8 is hinged to said portion of frame 12 of the motorcycle in relation to at least one hinge pin, not shown. It is to be specified that, the connection between the swingarm 8 and the frame 12 may be direct, by means of direct hinging, or may also be made by the interposition of linkages and/or intermediate subframes.

Both the rear swingarm 8 and the frame 12 may be of any shape or dimension and may for example be of the trellis type, box type, die-cast and so forth.

In any case the present invention is also applicable to a front suspension in which the suspension group is placed between the front wheel and a front portion of the frame; in such application the suspension group may for example be incorporated on the stems of the front fork or even at the steering tube so as to damp the front wheel group in relation to said tube or to an adjacent portion of the front frame of the motor vehicle.

The suspension group 4 for motor vehicles comprises a main spring 16 which extends between a first and a second end 20, 24 of the group, influencing them elastically along a working axis X-X.

The main spring 16 may be for example a cylindrical and/or conical spring with a constant or variable pitch; in addition the spring may be made of metal and/or polymer material. The main spring 16 may consist of any other elastic means suitable to apply an elastic force between the components it connects; so the main spring may also be a pneumatic and/or hydraulic spring.

The first and the second ends 20, 24 are kinematically connected to a first and second mass 28, 32 of the motorised vehicle respectively.

Such connection may be direct or provide for the interposition of linkages according to various solutions in use in the prior art. Such linkages are for example used to modify the usually linear behaviour of the spring depending on its effective length, both in extension and in compression.

Such kinematic connection is realised for example by means of the interposition of hinges 36 having hinge axes Y-Y parallel to each other and perpendicular to the working axis X-X. Preferably, said hinges 36 are directed along transversal hinge axes Y-Y, that is directed perpendicular to the direction of movement of the motorised vehicle. The presence of the hinges enables the suspension group to work mechanically adapting to the rotations of the swingarm and/or fork during the movement of the vehicle. In other words, the swingarm group acts as a connecting rod which suspends and dampens the relative movements between the first and the second mass 28, 32.

The first mass 28 is a mass suspended by the suspension group 4 and the second mass 32 is a non-suspended mass.

The suspended mass 28 usually comprises a portion of saddle and of frame of the motor vehicle, which in fact weighs on the suspension group. In the case of the rider and/or passenger being on board the vehicle, such additional masses constitute suspended masses. The definition of suspended mass applies both in the case of a front suspension group and in the case of a rear suspension group.

The non-suspended mass 32 is commonly called ground mass, in that it is a mass which discharges its weight on the ground through the tyre; typically the non-suspended mass 32 comprises the wheel or a portion of connection/support to a wheel of the motor vehicle. In addition, the non-suspended mass 32 comprises the swingarm or support fork of the wheel and any further accessories such as for example the braking devices directly connected to said wheel.

According to one embodiment, the main spring 16 is pre-loaded by pre-loading means (not shown) which together influence the spring 16 in compression and impose a rest length thereon $L_0$, namely the length assumed by the spring 16 when there are no further external loads on the first and/or on the second end 20, 24 of the group except for the pre-load caused by said pre-loading means.

In other words, the main spring 16 of the suspension group 4 is pre-loaded in compression by the pre-loading means which may for example comprise a mechanical ring-nut in the known manner. Such pre-loading means impose a rest length $L_0$ on the main spring 16 which is that assumed by the spring in the absence of further external loads such as for example the loads deriving from the suspended and/or non-suspended mass. For example, such rest length $L_0$ is that which the spring assumes when it is subjected solely to pre-loading compression and not to the weight force deriving from the suspended and/or non-suspended mass.

According to one embodiment, the suspension group further comprises a main damper 40 connected in parallel to said main spring 16 so as to exercise a damping action of the relative movement between said first and second ends 20,24, induced and/or countered by the main spring 16.

The main damper 40 is thus mechanically connected to said first and second end 20, 24.

Connection in parallel is taken to mean that both the main spring 16 and the main damper 40 are connected to the same ends 20, 24 so as to act mechanically on the same strokes and speed of movement between said ends 20,2 4.

According to one embodiment, the main damper 40 is positioned coaxially in relation to the main spring 16 and is thus directed parallel to said working axis X-X.

Advantageously, between at least one of said first and second ends 20, 24 and the respective suspended/non-suspended mass 28, 32 at least one kinematism 44 is placed, in series with the main spring 16 which permits a supplementary stroke S between the end 20, 24 to which it is attached and the relative adjacent suspended/non-suspended mass 28,32, said supplementary stroke S increasing the distance between the suspended and non-suspended mass 28,32 imposed by the extension of the main spring 16.

The kinematism 44 is influenced by the load of the suspended mass 28, so as to prove retracted, namely not to provide any supplementary stroke S, until the length of the main spring 16 is less than or equal to the rest length $L_0$, and so as to extend under the effect of the non-suspended mass 32, providing a supplementary stroke S, after the main spring 16 has extended reaching its rest length $L_0$.

The passage of the kinematism 44 from the retracted condition to the elongated or extraction condition may also occur before the main spring 16 has exactly reached its rest length $L_0$, for example as a result of the presence of a counter-spring 68 or even-merely by effect of vibrations or inertia of the suspended and non-suspended masses subject to oscillations.

It is clear that the kinematism 44 is able to freely and thus completely extend only when the main spring 16 is extended, reaching its rest length $L_0$, that is when the non-suspended mass 32 tends to detach itself from the ground; despite which tolerances of the extended condition of the kinematism 44 are admitted which may therefore also occur when the length of the main spring is approximately 3% less than the nominal value of the rest length $L_0$.

In other words, when the suspended mass and/or any additional masses (due for example to the rider and passenger) weigh on the main spring 16, this is compressed assuming an effective length less than that of the rest length $L_0$.

In such condition, the kinematism 44 is retracted in its closed condition; consequently it does not provide any supplementary stroke compared to the action and to the distance between the masses imposed by the main spring 16. The retraction of the kinematism 44 is caused by the action of the weight due to the suspended mass which closes it completely When the main spring 16 extends, reaching its rest length $L_0$, the kinematism is free to extend providing the supplementary stroke S. The extended condition of the main spring 16 until it reaches the rest length $L_0$ occurs when, on account of the jumps caused by the asperities of the terrain or on account of the dynamic transfers of the load, the non-suspended mass tends to lose contact with the ground: in such condition, the main spring 16 is subject only to its pre-load and can thus extend to reach its rest length $L_0$. In such condition the kinematism is no longer flattened by the suspended mass 28 and is thus in turn free to extend, providing the supplementary stroke S which enables the wheel to maintain contact with the ground.

It is evident that such contact is ensured as long as the lifting of the wheel is less than or equal to the supplementary stroke S provided by the kinematism 44.

The kinematism 44 also extends merely thanks to the thrust action of the non-suspended mass 32 to which it is kinematically connected If the kinematism 44 is applied to the second end 24, such non-suspended mass 32 comprises for example the wheel and its support; if the kinematism 44 is applied to the first end 20, such non-suspended mass 32 also comprises the mass of the main spring 16 and of the main damper 40.

Preferably, the main spring 16 guarantees a main stroke equal to at least 2.5 times the supplementary stroke S due to the kinematism 44; in particular, the main stroke is defined by the difference between the length at rest $L_0$ of the main spring 16 and the minimum length of the main spring 16 achieved in conditions of maximum admissible load in compression.

According to one embodiment, the kinematism 44 comprises at least one secondary spring 48 which influences the kinematism 44 in extension so as to pass from the retracted configuration to the extracted configuration, said secondary spring 48 extending the kinematism 44 after the main spring has extended reaching its rest length $L_0$.

Preferably, the rigidity of the main spring 16 is at least 8 times the rigidity of the secondary spring 48.

Rigidity of the main spring is taken to mean the overall rigidity of the elastic system comprising the main spring 16 plus a possible counter-spring 68 further described below.

According to one embodiment, said kinematism 44 comprises at least one secondary damper 52 suitable for damping the compression and extension movement of the kinematism.

The secondary damper 52 may for example be of the pneumatic, hydraulic or even friction type.

Preferably, the secondary damper 52 influences the kinematism 44 mainly in compression so as to damp the reclosing stroke of said kinematism. In other words, the behaviour of the damper of the kinematism is highly asymmetric given that it is minimum in extension of the kinematism and is maximum in compression of said kinematism. This way, the extension of the kinematism in the lifting step of the non suspended mass 32 is facilitated and the support of the wheel resting on the ground is also facilitated, once said kinematism is extended.

Various implementations of solutions of kinematisms fitted with a secondary spring 48 and/or secondary damper 52 are possible, using as secondary springs 48, mechanical springs of various types such as helical traction springs (FIG. 18b), compression (FIGS. 17a, b and c, FIG. 18 a) or torsion (FIG. 18 c), spring washers or pneumatic springs (FIG. 17d). The arrangement of said secondary springs 48 may be such as to tend to make the aforesaid kinematism remain at a degree of freedom in its position of maximum extension or in its closed position, or in equilibrium in an intermediate position:

should it tend to keep the kinematism in the closed position, the rigidity is chosen in such a way that said kinematism 44 extends completely or almost under the action of the non suspended mass 32 (or of the relative wheel and all the elements of the suspension connected between the wheel and said kinematism) when the vehicle is lifted so that the wheels detach from the ground.

should it instead tend to keep the kinematism 44 in the completely extended or intermediate position, the rigidity must be chosen in such a way that the main elastic subsystem of the suspension proves compressed by a practically negligible entity when the force needed to bring it into a closed position is applied to the kinematism.

As regards the secondary damping this may be realised by means of friction inside the kinematism 44 along its direction of permitted movement or with the usual means for realising hydraulic or pneumatic dampers. that is, making two fluid chambers separated by a mobile piston (FIGS. 19a,b and c) and interconnected by means of valves or passages of a greatly reduced size, in such a way that during its movement the kinematism forces the piston to move inside the aforesaid chambers, forcing the fluid to circulate from one to the other. The fluid, passing through the aforesaid valves or passages, undergoes a pressure variation, so that the difference in pressure of the fluid of the two chambers exercises a thrust resulting on the mobile piston in a direction such as to oppose the movement thereof.

Figure 19C:
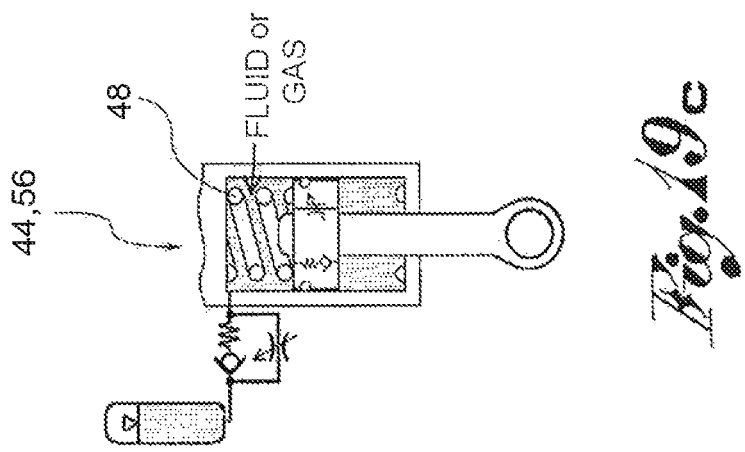
Figure 19B:
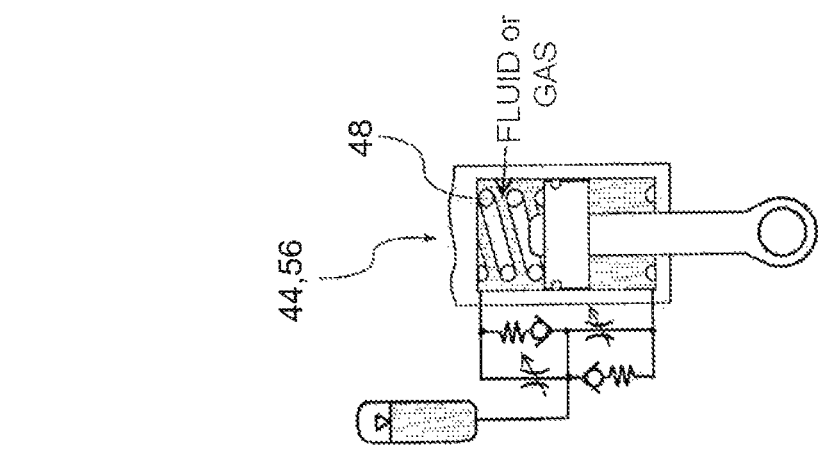
Figure 19A:
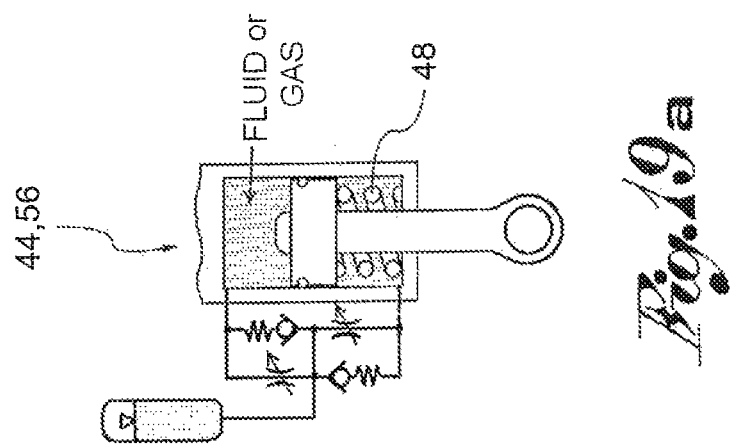

With these means it is possible to realise one-way dampers, that is which provide much more damping in one direction than in another (FIG. 19 c). It is preferable in such case to provide a greater damping in the direction from the position of maximum extension of the kinematism 44 to the closed position, to reduce the effect of the sudden reclosing the kinematism 44 which invokes the elastic subsystem with an impulsive stress when the vehicle resumes loading the weight on the wheel.

Figure 20C:
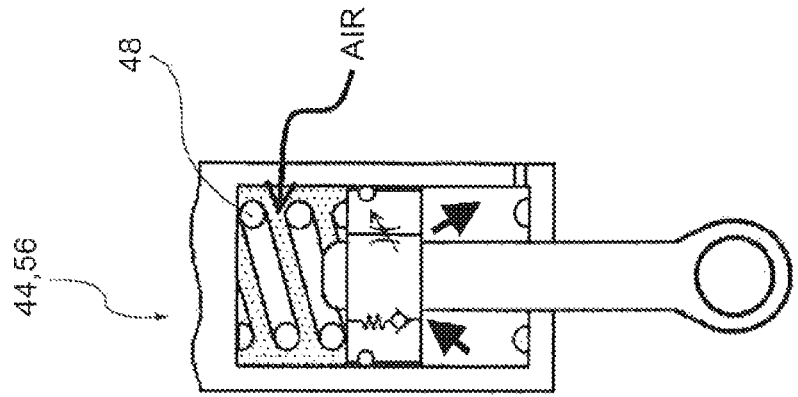
Figure 20B:
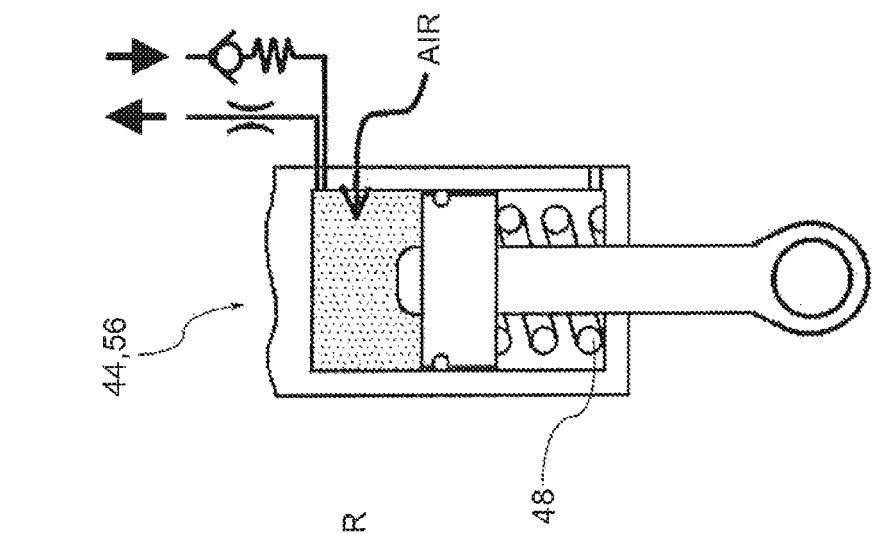
Figure 20A:
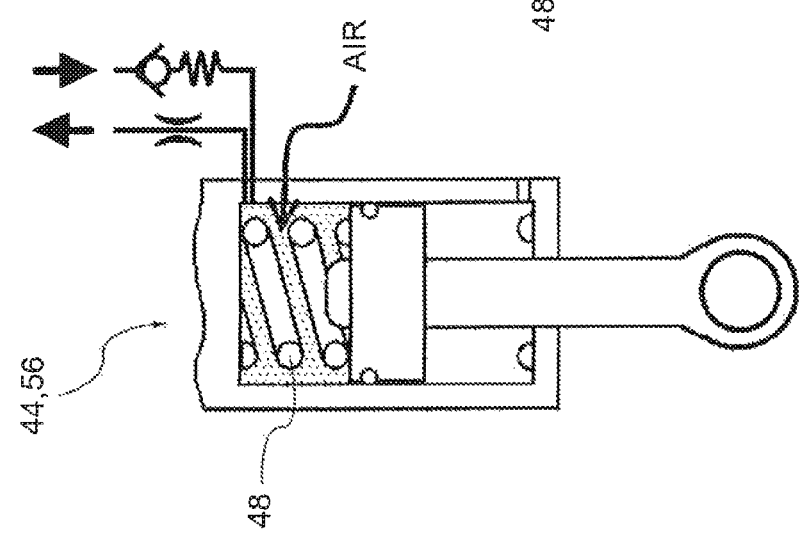

In a particular application (FIG. 20 a, b and c) the fluid used is the atmospheric air and the kinematism consists of a prismatic torque made at one end of the elastic subsystem in the form of a cylindrical body separated into two chambers by a piston, to which a stem is connected which at the other end is connected to the remaining components of the suspension system. The devices aspirates air in the upper chamber through a check valve when the kinematism extends and then expels it through a calibrated discharge hole when the kinematism returns towards the closed position. At most the realisation of the calibrated discharge hole may be omitted, should the system seep air on account of an imperfect seal of the chamber or of the check valve.

Limit stop pads in elastomeric material may be provided for, so that when the kinematism reaches its closed position or its maximum extension no violent impacts between metal parts are triggered, which could cause damage to the system or unpleasant sensations for the driving of the vehicle.

According to one embodiment, the kinematism 44 comprises a prismatic guide 56 which permits a reciprocating rectilinear movement along a kinematism axis W-W parallel to said working axis X-X of the main spring 16.

For example, said prismatic guide 56 comprises a stem 58 sliding inside a lining 60.

The secondary spring 48 and/or the secondary damper 52, if provided for, are housed inside said lining.

According to a further embodiment, the kinematism 44 comprises a connecting rod 64 which connects the relative end 20, 24 with the suspended/non-suspended mass 28, 32.

The kinematism 44 may comprise a secondary spring 48 having one end connected to the rod 64 and one end connected to the relative suspended/non-suspended mass 28, 32 so as to influence the kinematism 44 in extension, that is, to open.

The suspension group 4 according to the present invention may also comprise two kinematisms 44', 44" positioned in series between each of said first and second ends 20, 24 and the respective suspended/non-suspended mass (28, 32); this way each kinematism permits a supplementary stroke S', S" between the ends 20, 24 to which it is applied and the relative adjacent suspended/non-suspended mass 28, 32. In particular, each kinematism 44', 44" is influenced by the load of the suspended mass 28, so as to prove retracted, namely not to provide any supplementary stroke S', S", until the length of the main spring 16 has reached its rest length $L_0$, and so as to extend under the thrust of the non-suspended mass 32, providing said supplementary stroke S', S" after the main spring 16 has reached its rest length $L_0$.

According to a possible embodiment, the pre-loading means comprise a counter-spring 68 which acts so as to influence the main spring 16 in extension, that is which opposes the elastic action of the main spring 16 (FIGS. 9a 14b).

As described above, the pre-loading means together influence the spring 16 in compression and impose a specific rest length thereon $L_0$. Consequently the counter spring 68, while pre-loading in extension, does not modify the overall pre-load of the main spring 16 which is in any case an overall pre-load of compression.

According to a possible embodiment, the counter-spring 68 is housed inside the main damper 40.

The functioning and thus the regulation of a suspension group for motor cycles according to the present invention will now be described.

In particular, in conditions of normal use, namely when the motorised vehicle has the non suspended mass in contact with the ground, the kinematism is in the closed position. Consequently, the kinematism does not provide any supplementary stroke over the stroke or distance imposed by the main spring to the suspended and non-suspended masses.

Such functioning condition is, for example illustrated in FIGS. 3a-14a. As may be seen in such FIGS. 3a-14a, the kinematism is always closed under the load of the suspended mass, that is does not provide any supplementary stroke S, while the main spring 16 is at least partially compressed compared to its rest condition; in other words, the main spring has a length L less than its rest length $L_0$.

In such condition the kinematism does not influence the behaviour of the suspension and thus the rigidity and overall damping of the suspension group, In such condition the length of the main spring is less than the rest length $L_0$ given that the load of the suspended mass which is usually greater than the pre-load imposed by the pre-loading means, weighs on such main spring.

When for example due to a sudden transfer of load (for example upon braking) the rear suspension group tends to unload, the main spring being relieved of the load deriving from the suspended mass, tends to extend until it reaches its rest length $L_0$, that is the length deriving solely from the pre-load imposed. In this condition, as shown for example in FIGS. 3b-14b, the non-suspended mass, namely the rear wheel would tend to lose contact with the ground, putting the dynamics of the motorised vehicle in a critical situation.

As may be seen in such FIGS. 3b-14b, the kinematism 44 is open, that is, extended under the load of the non-suspended mass, namely, provides the supplementary stroke S, while the main spring 16 is extended as far as to reach its rest condition; in other words, the main spring has a length equal to its rest length $L_0$.

In such condition, as soon as the spring reaches its rest length $L_0$, that is as soon as the spring extends concurrently with the detachment of the wheel from the ground (which coincides with the loss of the load due to the suspended mass), the kinematism extends permitting the rear wheel to recover contact with the ground and thereby improve the dynamics of the motorised vehicle. It is evident that the kinematism extends thanks to the action of the load deriving from the non-suspended mass which always tends to extend it, as well as thanks to the action of the possible secondary spring.

This way, the winding motion and loss of adherence for example of the rear wheel is significantly limited when, on account of a sudden transfer of load, for example when braking or on account of an uneven road surface, such wheel would tend to detach from the ground. The kinematism is thus able to ensure contact with the ground as long as the lifting of the rear wheel is less than or equal to the supplementary stroke supplied by said kinematism.

The functioning of the suspension group according to the present invention can also be seen in schematic form in the force-excursion diagrams shown in FIGS. 15 and 16.

Figure 15C:
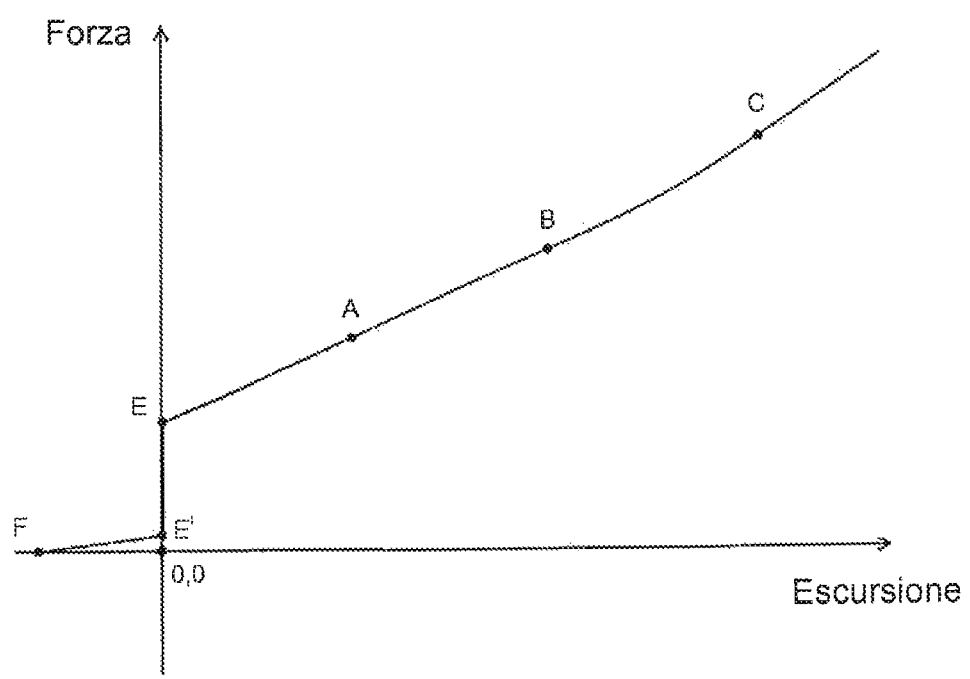

For example, FIGS. 15a-15c show force-excursion diagrams of suspension groups according to the present invention, but without a counter-spring.

It is to be specified that, the y-axis shows the elastic force exercised between said ends 20,24 and thus the suspended mass and the non-suspended mass 28,32 (without the interposition between said ends 20,24 and the masses 28,32 of linkages, as used in the prior art).

The x-axis shows the excursion of the main spring 16 compared to its rest length $L_0$, corresponding to point 0,0. Consequently a positive excursion (in relation to the diagram) corresponds to a compression of the main spring 16 in relation to its rest length $L_0$; in the same way, a negative excursion, that is the negative x-axis of the graph, corresponds to a lengthening or extension of the kinematism 44.

The points A,B,C on the graphs represent design parameters, that is values which are pre-set depending on the type of motorised vehicle; point A for example represents the load condition due to the weight of the vehicle, that is the design suspended mass.

The graph in FIG. 15b shows the behaviour of the suspension group 4 wherein the kinematism 44 is lacking any secondary spring (the graphs show static conditions there is therefore no point in speaking of the effect of a possible secondary damper).

As may be seen, the absence of any secondary spring makes the force decline nominally to zero, at the moment in which the main spring reaches its rest length $L_0$ (corresponding to point 0 on the x-axis). In this condition, the kinematism 44 extends under the thrust of the non-suspended mass.

The presence of a secondary spring 48 slightly modifies the graph. For example, the graph in FIG. 15a shows the suspension group of FIG. 15b also comprising a secondary spring 48 acting in traction, that is tending to counter the extension of the kinematism 44. Such condition determines the section G0 along which the spring 48 applies a force which tends to lift the non-suspended mass from the ground, said force gradually increasing as the excursion S increases. The force of contact on the ground of the corresponding wheel will thus gradually fall to zero. Such condition is in any case preferable to the brusque annulment of the load which occurs in the solutions of the prior art, that is which do not use the kinematism 44. Instead, the graph in FIG. 15c shows the suspension group of FIG. 15b also comprising a secondary spring 48 acting in compression, that is tending to facilitate the extension of the kinematism 44. Such condition determines the section E'F which has a positive effect on the behaviour of the suspension given that it tends to counter the detachment of the wheel from the ground, as may be seen by the fact that the force, once reaching the point 0,0 does not invert direction: the wheel is thus pushed against the ground. The stroke corresponding to the section 0F is equal to the supplementary stroke S given by said kinematism.

Figure 16A:
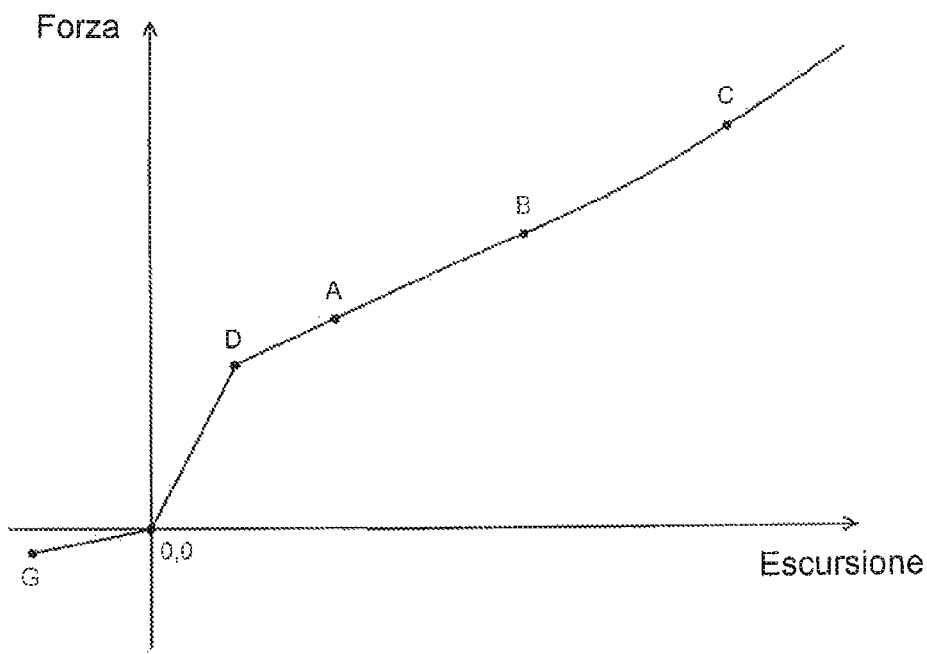
FIGS. 16a-16c show the force-excursion diagrams relative to the construction solutions illustrated in FIGS. 9a,9b-14a,14b.
Figure 16B:
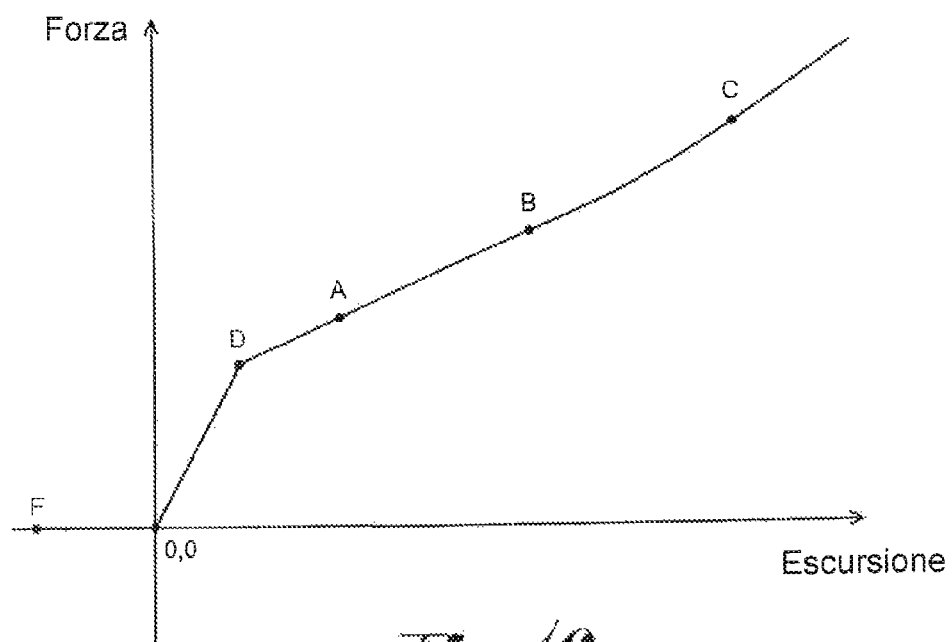
Figure 16C:
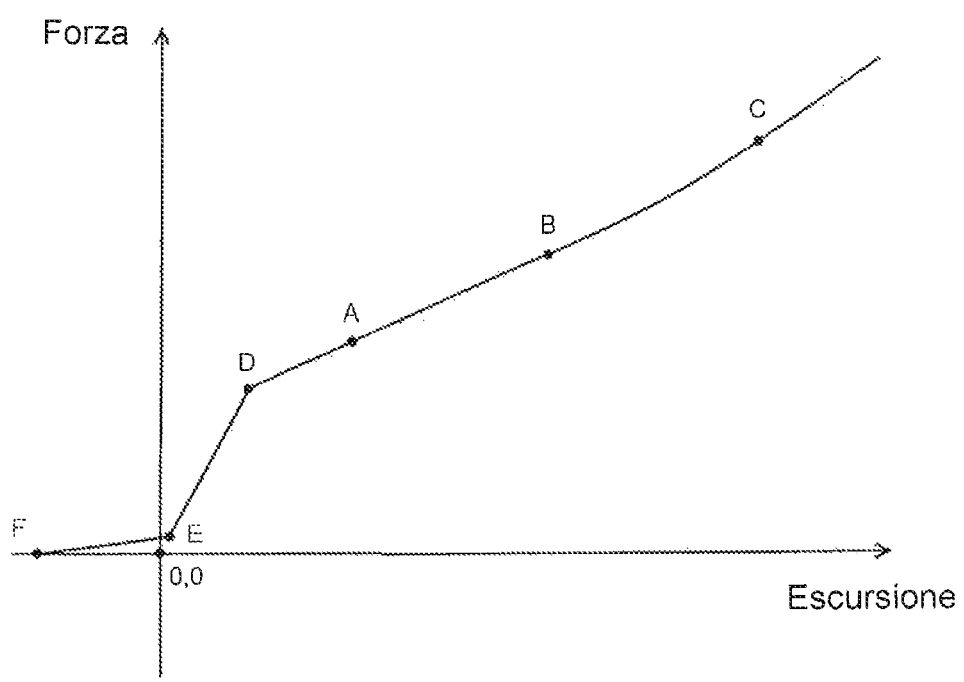

The graphs in FIGS. 16a-16c correspond to the same functioning conditions as the graphs in FIGS. 15a-15c except for the fact that the suspension group is fitted with a counter-spring 68.

As may be seen, the effect of such counter spring 68 may be seen in the section which goes from the origin 0,0 as far as point D. Such section prevents sudden drops in force given that the main spring tends to extend as far as it rest length $L_0$. This way, the behaviour of the spring is much more progressive and counters any brusque transfers of load. The condition of FIG. 16b provides for the absence of any secondary spring 48; FIG. 16a provides for a secondary spring 48 acting in traction (as in FIG. 15a) and FIG. 16c provides for a secondary spring 48 acting in compression (as in FIG. 15c).

The suspension group described may also be applied to a front wheel of a vehicle. In such case the detachment phenomena of the wheel from the ground may be due for example to an uneven road surface or for example to sudden transfers of load due to sudden accelerations. In both situations, the kinematism is able to ensure the contact of the wheel with the ground making it possible to achieve the directionality of the vehicle as long as the lifting stroke does not exceed the supplementary stroke provided by said kinematism.

As may be seen from the description, the suspension according to the invention makes it possible to overcome the drawbacks of the prior art presented.

In particular, the solution according to the present invention makes it possible to ensure the contact of the wheel with the ground even in conditions of elevated transfers of load due to energetic braking and/or to jumping of the wheel due to an uneven road surface.

The kinematism does not influence or modify the functioning parameters of the suspension as long as it remains in the retracted or closed condition; this way the kinematism does not prove invasive and does not influence the design parameters of the suspension At the same time, the kinematism automatically intervenes in the functioning of the suspension only in critical conditions, that is to say when the wheel begins to jump due for example to transfers of load when braking and/or to an uneven road surface. The intervention of the kinematism considerably improves the stability of the motorised vehicle given that it always guarantees a margin of traction and/or of directionality of the wheel thanks to the recovery of contact with the road surface thereof.

In any case, upon cessation of the jumping/detachment phenomenon of the wheel the kinematism automatically returns to its closed condition so as not to interfere with the functioning parameters of the suspension group.

The kinematism is of such dimensions and weight as to be substantially negligible compared to the dimensions and weight of the spring and of the main damper.

The kinematism significantly improves the stability and thus the safety of the motorised vehicle in all conditions of potential detachment of the wheel from the ground.

The kinematism allows for greater design freedom in the choice of the main parameters of the suspension group, that is, of the spring and of the main damper.

In fact, in the absence of the kinematism the extension of the main spring due to the load of the non-suspended mass would be extremely limited if not null on account of the fact that such spring must normally be extremely rigid. Such elevated rigidity in fact prevents the lengthening of the spring beyond its rest length $L_0$.

The addition of the kinematism in fact makes it possible not to modify the rigidity of the main spring and at the same time to permit a recovery of the lifting stroke of the wheel thanks to the supplementary stroke provided by said kinematism.

A person skilled in the art may make numerous modifications and variations to the suspension groups described above so as to satisfy contingent and specific requirements, while remaining within the sphere of protection of the invention as defined by the following claims.

The invention claimed is:

1. Suspension group for motor vehicles comprising
a main spring which extends between a first and a second end of the group, influencing them elastically along a working axis,
a main damper connected in parallel to said main spring so as to exercise a damping action of the relative movement between said first and second ends, induced and/or countered by the main spring,
said main spring being pre-loaded by pre-loading means which together influence the spring in compression and impose a rest length thereon, namely the length assumed by the spring when there are no further external loads on the first and/or on the second end of the group except for the pre-load caused by the pre-loading means,
in which the first and second end are connected kinematically to a first and a second mass of the motor vehicle respectively, the first mass being a mass suspended by the suspension group and the second mass being a non-suspended mass and comprising a wheel or a portion of connection/support to a wheel of the motor vehicle, wherein
between at least one of said first and second ends and the respective suspended/non-suspended mass at least one kinematism is placed, in series with the main spring which permits a supplementary stroke between the end to which it is attached and the relative adjacent suspended/non-suspended mass, said supplementary stroke increasing the distance between the suspended and non-suspended mass imposed by the extension of the main spring,
wherein the kinematism is influenced by the load of the suspended mass, so as to prove retracted, namely not to provide any supplementary stroke, until the length of the main spring is less than or equal to the rest length, and so as to extend under the effect of the non-suspended mass, providing a supplementary stroke, after the main spring has extended reaching its rest length.

2. Suspension group according to claim 1, wherein the kinematism comprises at least one secondary spring which influences the kinematism in extension so as to pass from the retracted configuration to the extracted configuration, said secondary spring extending the kinematism after the main spring has extended reaching its rest length.

3. Suspension group according to claim 1, wherein the kinematism comprises at least one secondary spring which influences the kinematism in traction so as to pass from the extracted configuration to the retracted configuration.

4. Suspension group according to claim 1, wherein said kinematism comprises at least one secondary damper suitable for damping the compression and extension movement of the kinematism.

5. Suspension group according to claim 1, wherein the kinematism comprises a prismatic guide which permits a reciprocating rectilinear movement along a kinematism axis parallel to said working axis of the main spring.

6. Suspension group according to claim 5, when dependent on claim 2, wherein said prismatic guide comprises a stem sliding inside a lining, wherein the secondary spring and/or the secondary damper are housed inside said lining.

7. Suspension group according to claim 1, wherein the kinematism comprises a connecting rod which connects the relative end to which the suspended/non-suspended mass is applied.

8. Suspension group according to claim 7, wherein the kinematism comprises a secondary spring having one end connected to the rod and one end connected to the relative suspended/non-suspended mass so as to influence the kinematism in extension.

9. Suspension group according to claim 1, wherein said pre-loading means comprise a counter-spring which acts so as to influence the main spring in extension, that is which opposes the elastic action of the main spring.

10. Suspension group according to claim 9, wherein said counter-spring is housed inside the main damper.

11. Suspension group according to claim 1, wherein the main damper is mechanically connected to said first and second ends.

12. Suspension group according to claim 1, wherein the main damper is positioned coaxially in relation to the main spring.

13. Suspension group according to claim 1, wherein between each of said first and second ends and the respective suspended/non-suspended mass a kinematism is placed, in series, which permits a supplementary stroke between the ends to which it is applied and the relative adjacent suspended/non-suspended mass, each kinematism being influenced by the load of the suspended mass, so as to prove retracted, namely not to provide any supplementary stroke, until the length of the main spring is less than or equal to the rest length, and so as to extend under the effect of the non-suspended mass, providing a supplementary stroke, after the main spring has extended reaching its rest length.

14. Suspension group according to claim 1, wherein the first and the second end are kinematically connected to the first and to the second mass of the motor vehicle respectively by means of hinges having hinge axes parallel to each other and perpendicular to the working axis.

15. Suspension group according to claim 1, wherein the kinematism comprises at least one secondary spring which influences the kinematism in extension, and wherein the rigidity of the main spring, if applicable also comprising the rigidity of any counter-spring is at least 8 times the rigidity of the secondary spring.

16. Suspension group according to claim 1, wherein the main spring guarantees a main stroke equal to at least 2.5 times the supplementary stroke due to the kinematism, the main stroke being defined by the difference between the length at rest of the main spring and the minimum length of the main spring achieved in conditions of maximum admissible load in compression.

17. Suspension group according to claim 1, wherein the kinematism comprises at least one secondary damper which influences the kinematism in compression to damp the reclosing stroke of the kinematism.

18. Suspension group according to claim 1, wherein the non-suspended mass comprises a rear wheel of the motor vehicle and part of the fork supporting said rear wheel and wherein the suspended mass comprises or is mechanically attached to the support frame of the saddle of the motor vehicle.

19. Motor vehicle comprising a suspension group according to claim 1.

* * * * *